(12) United States Patent
Nakano et al.

(10) Patent No.: US 9,720,391 B2
(45) Date of Patent: Aug. 1, 2017

(54) COORDINATION PROCESSING EXECUTION METHOD AND COORDINATION PROCESSING EXECUTION SYSTEM

(71) Applicant: Panasonic Corporation, Osaka (JP)

(72) Inventors: Toshihisa Nakano, Osaka (JP); Masayuki Kozuka, Osaka (JP); Masataka Minami, Hyogo (JP); Motoji Ohmori, Osaka (JP); Takeshi Matsuo, Nara (JP); Tsuyoshi Sakata, Osaka (JP); Fumiaki Suzuki, Osaka (JP); Masao Nonaka, Osaka (JP); Ryota Miyazaki, Osaka (JP); Kazuo Kajimoto, Osaka (JP); Yoshiyuki Miyabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 434 days.

(21) Appl. No.: 14/381,312

(22) PCT Filed: Aug. 1, 2013

(86) PCT No.: PCT/JP2013/004677
§ 371 (c)(1),
(2) Date: Aug. 27, 2014

(87) PCT Pub. No.: WO2014/024442
PCT Pub. Date: Feb. 13, 2014

(65) Prior Publication Data
US 2015/0066169 A1   Mar. 5, 2015

Related U.S. Application Data

(60) Provisional application No. 61/707,270, filed on Sep. 28, 2012, provisional application No. 61/680,394, filed on Aug. 7, 2012.

(51) Int. Cl.
*G05B 15/02* (2006.01)
*H04L 12/28* (2006.01)
(Continued)

(52) U.S. Cl.
CPC ............ *G05B 15/02* (2013.01); *H04L 12/282* (2013.01); *H04L 12/2816* (2013.01);
(Continued)

(58) Field of Classification Search
None
See application file for complete search history.

(56) References Cited

U.S. PATENT DOCUMENTS

2011/0231320 A1\* 9/2011 Irving .................... G06Q 30/00
705/80
2013/0151012 A1\* 6/2013 Shetty ................ G05D 23/1923
700/276

FOREIGN PATENT DOCUMENTS

JP   2002-085886   3/2002
JP   2003-319471   11/2003
(Continued)

OTHER PUBLICATIONS

International Search Report issued Aug. 27, 2013 in International (PCT) Application No. PCT/JP2013/004677.
(Continued)

*Primary Examiner* — Eric C Wai
(74) *Attorney, Agent, or Firm* — Wenderoth, Lind & Ponack, L.L.P.

(57) ABSTRACT

A user-friendly cooperative process execution method for causing household electric devices that are registered to a server to execute cooperative processes. The server stores correspondence information associating a particular operation to be executed by a particular household electric device with one or more groups each composed of one or more
(Continued)

household electric devices, and indicating, for each of the household electric devices in each of the groups, a control signal to be transmitted to the household electric device. The method includes: detecting whether or not the particular operation is executed; selecting one of the groups that is composed of one or more household electric devices that are registered to the server by referring to the correspondence information when the execution of the particular operation is detected; and transmitting the control signal to each of the household electric devices in the selected group.

5 Claims, 23 Drawing Sheets

(51) Int. Cl.
  *H04L 29/08* (2006.01)
  *G06F 17/00* (2006.01)

(52) U.S. Cl.
  CPC .......... *H04L 12/2825* (2013.01); *H04L 67/12* (2013.01); *G05B 2219/2642* (2013.01)

(56) References Cited

FOREIGN PATENT DOCUMENTS

| | | |
|---|---|---|
| JP | 2006-101283 | 4/2006 |
| JP | 2011-158186 | 8/2011 |

OTHER PUBLICATIONS

Takeshi Saito and Hiroshi Isozaki, "Home Network Content Protection", Toshiba Review, vol. 58, No. 6, Jun. 1, 2013, pp. 12-15 (with English Abstract).

* cited by examiner

FIG. 3

| Device ID (Device name) | Product code (Product type) | Software version | Operation ID (Operation name) | Control command | Registration state |
|---|---|---|---|---|---|
| 311 → First household electric device | P-06D (Smartphone) | 1.12 | A1 (Power ON) | D201xxxx | 1 (Registered) |
| | | | A2 (Alarm) | D205xxxx | |
| | | | ⋮ | ⋮ | |
| 312 → Second household electric device | CS-X252C (Air conditioner) | 1.01 | B1 (Power ON) | 9203xxxx | 1 (Registered) |
| | | | B2 (High-power mode operation) | 9252xxxx | |
| | | | B3 (Power-saving mode operation) | 9280xxxx | |
| | | | ⋮ | ⋮ | |
| 313 → Third household electric device | SR-SX102 (Rice cooker) | 1.03 | C1 (Power ON) | 800Fxxxx | 1 (Registered) |
| | | | C2 (Rice cooking start) | 8020xxxx | |
| | | | ⋮ | ⋮ | |
| 314 → Fourth household electric device | NA-VX8200L (Washing machine) | 1.10 | D1 (Power ON) | 9101xxxx | 1 (Registered) |
| | | | D2 (Washing start) | 9104xxxx | |
| | | | ⋮ | ⋮ | |
| 315 → Fifth household electric device | DMC-TZ40 (Digital camera) | 1.00 | E1 (Power ON) | A209xxxx | 0 (Not registered) |
| | | | E2 (Image capture) | A285xxxx | |
| | | | ⋮ | ⋮ | |
| 316 → Sixth household electric device | HH-LC712A (Ceiling light) | 1.01 | F1 (Light up) | E942xxxx | 0 (Not registered) |
| | | | F2 (Cinema mode) | EA94xxxx | |
| | | | F3 (Power-saving mode) | E548xxxx | |
| | | | F4 (ON timer) | E968xxxx | |
| 317 → Seventh household electric device | BG-849 (Air conditioner) | 2.10 | G1 (Power ON) | 3924xxxx | 0 (Not registered) |
| | | | G2 (ON timer) | 8643xxxx | |
| | | | ⋮ | ⋮ | |
| 318 → Eighth household electric device | COF-63B (Coffee maker) | 1.09 | H1 (Power ON) | 5829xxxx | 0 (Not registered) |
| | | | H2 (Brewing start) | 6487xxxx | |
| | | | H3 (Timer brewing) | 935Exxxx | |
| | | | ⋮ | ⋮ | |
| 319 → Ninth household electric device | TH-P65VT60 (Television) | 1.01 | J1 (Power ON) | 6385xxxx | 0 (Not registered) |
| | | | ⋮ | ⋮ | |
| ⋮ | ⋮ | ⋮ | ⋮ | ⋮ | ⋮ |

FIG. 4

|  | First cooperative process | | Second cooperative process | | Third cooperative process | | Fourth cooperative process | | Fifth cooperative process | | Sixth cooperative process | | Seventh cooperative process | | Eighth cooperative process | | |
|---|---|---|---|---|---|---|---|---|---|---|---|---|---|---|---|---|---|
|  | Device ID | Operation ID | Device ID | Operation ID | Device ID | Operation ID | Device ID | Operation ID | Device ID | Operation ID | Device ID | Operation ID | Device ID | Operation ID | Device ID | Operation ID | |
| First operation | 1 | A2 | 1 | A2 | 1 | A2 | 1 | A2 | 1 | A2 | 2 | B1 | 6 | F1 | 6 | F1 | ⋮ |
| Second operation | 2 | B3 | 2 | B2 | 2 | B3 | 7 | G2 | 7 | G2 | 6 | F1 | 2 | B3 | 2 | B1 | ⋮ |
| Third operation | 3 | C2 | 3 | C2 | 3 | C2 | 3 | C2 | 3 | C2 |  |  |  |  | 9 | J1 | ⋮ |
| Fourth operation |  |  | 8 | H2 | 4 | D2 | 8 | H2 | 4 | D2 |  |  |  |  |  |  | ⋮ |

| Device ID (Device name) | Product code (Product type) | Software version | Operation ID (Operation name) | Control command |
|---|---|---|---|---|
| 1 (First household electric device) | P-06D (Smartphone) | 1.12 | A1 (Power ON) | D201xxxx |
| | | | A2 (Alarm) | D205xxxx |
| | | | .. | .. |

FIG. 9

| Execution control number | Specification of time (Parameter) | Device ID | Operation ID |
|---|---|---|---|
| 1 | 7:00 | 2 | B2 |
|   | 7:00 | 3 | C2 |
| 2 | 6:55 | 2 | B2 |
|   | 7:05 | 3 | C2 |
|   | 7:10 | 4 | D2 |
| ⋮ | ⋮ | ⋮ | ⋮ |

FIG. 16

| | X1 (First cooperative process) | | | X2 (Second cooperative process) | | | X3 (Third cooperative process) | | | X4 (Fourth cooperative process) | | | X5 (Fifth cooperative process) | | | X8 (Eighth cooperative process) | | | |
|---|---|---|---|---|---|---|---|---|---|---|---|---|---|---|---|---|---|---|---|
| | Device ID | Operation ID | Off-set | Device ID | Operation ID | Off-set | Device ID | Operation ID | Off-set | Device ID | Operation ID | Off-set | Device ID | Operation ID | Off-set | Device ID | Operation ID | Off-set | |
| First operation | 1 | A2 | 1 | 1 | A2 | 1 | 1 | A2 | 1 | 1 | A2 | 1 | 1 | A2 | 1 | 6 | F1 | 0 | ... |
| Second operation | 2 | B3 | −5 | 2 | B2 | −1 | 2 | B3 | −5 | 7 | G2 | −10 | 7 | G2 | −5 | 2 | B1 | 0 | ... |
| Third operation | 3 | C2 | +5 | 3 | C2 | +15 | 3 | C2 | +5 | 3 | C2 | +15 | 3 | C2 | +15 | 9 | J1 | 0 | ... |
| Fourth operation | | | | 8 | H2 | | 4 | D2 | +10 | 8 | H2 | | 4 | D2 | +45 | | | | ... |

FIG. 18

| Time information (date/time) | Device ID | Operation ID |
|---|---|---|
| 12:00, June 1, 2013 | 1 | A2 |
| 12:00, June 2, 2013 | 1 | A2 |
| 18:00, June 2, 2013 | 2 | B1 |
| 18:01, June 2, 2013 | 2 | B2 |
| 12:00, June 3, 2013 | 1 | A2 |
| 18:30, June 3, 2013 | 3 | C2 |
| 12:00, June 4, 2013 | 1 | A2 |
| 12:00, June 5, 2013 | 1 | A2 |
| ⋮ | ⋮ | ⋮ |

FIG. 21

| Multiple cooperative process \ Operations | First multiple cooperative process | | Second multiple cooperative process | | Third multiple cooperative process | | Fourth multiple cooperative process | | Fifth multiple cooperative process | |
|---|---|---|---|---|---|---|---|---|---|---|
| | Group ID | Operation ID | Group ID | Operation ID | Group ID | Operation ID | Group ID | Operation ID | Group ID | Operation ID |
| First unit cooperative process | 1 | X2 | 2 | X1 | 2 | X2 | 3 | X2 | 4 | X2 |
| Second unit cooperative process | 2 | X3 | 1 | X6 | 1 | X7 | 1 | X4 | 1 | X8 |
| Third unit cooperative process | 3 | X1 | | | 3 | X5 | | | 3 | X3 |

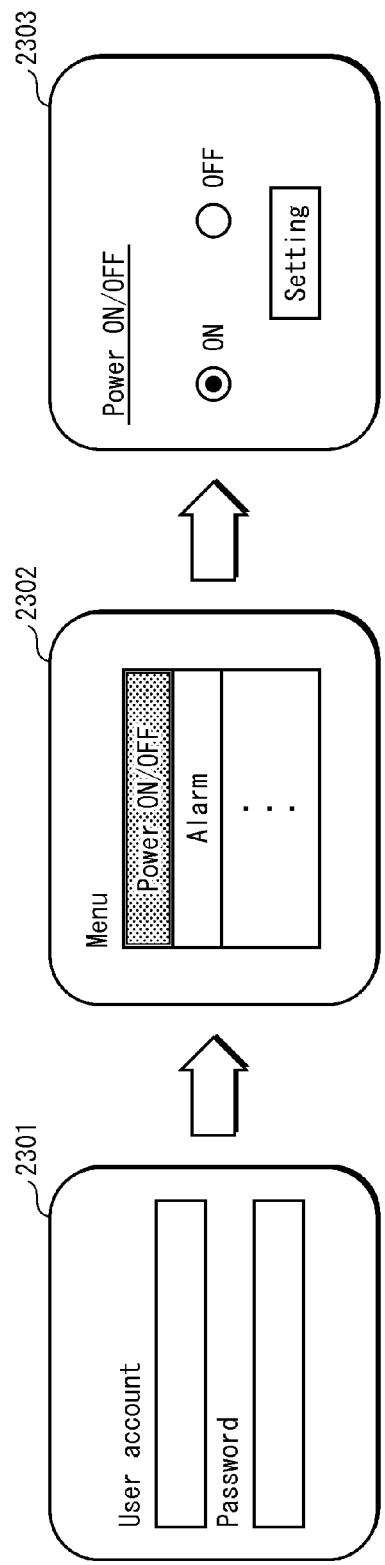

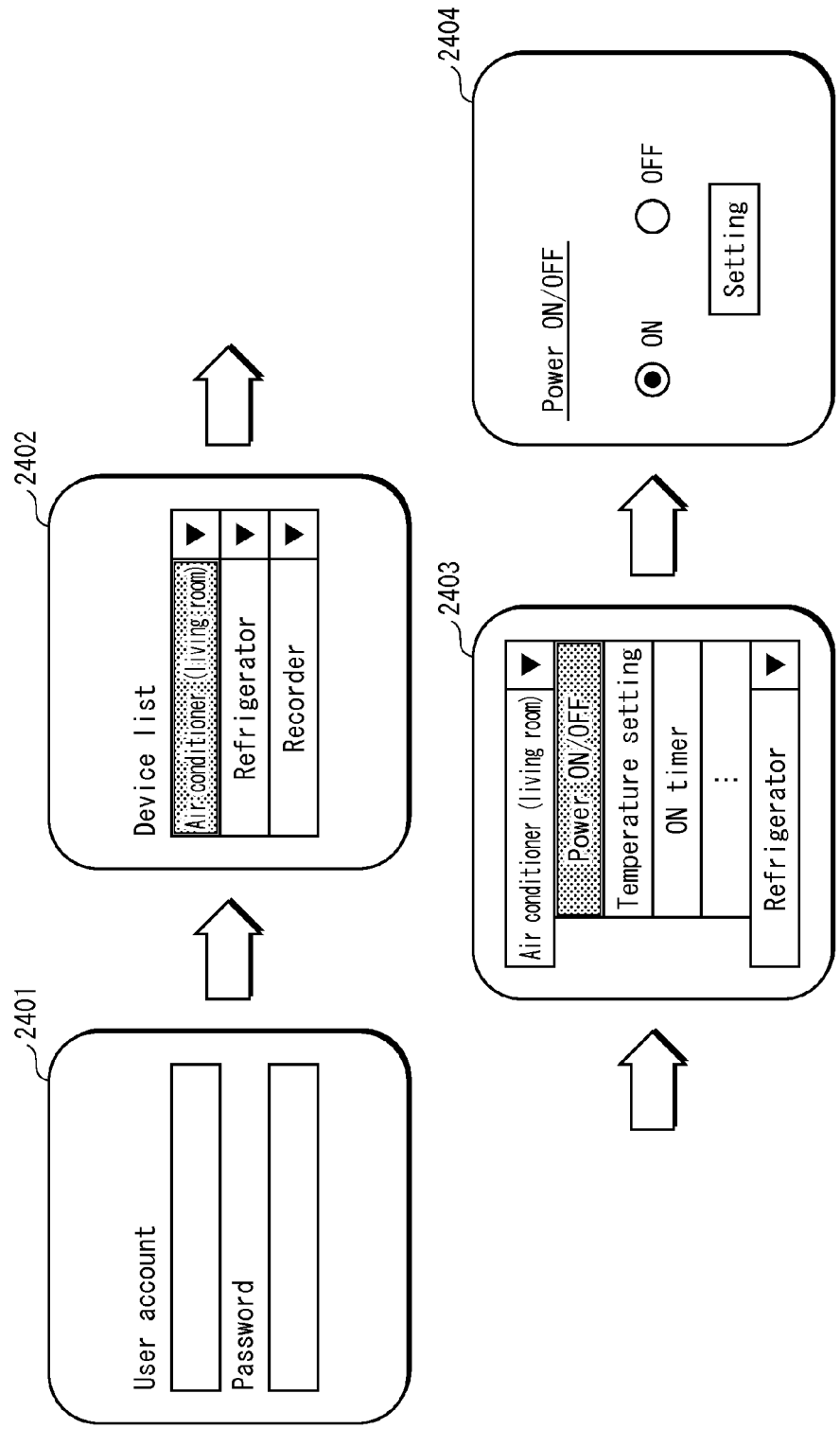

COORDINATION PROCESSING EXECUTION METHOD AND COORDINATION PROCESSING EXECUTION SYSTEM

This application claims benefit to the provisional U.S. application No. 61/680,394 filed on Aug. 7, 2012 and No. 61/707,270 filed on Sep. 28, 2012.

TECHNICAL FIELD

The present disclosure relates to a method of causing a plurality of household electric devices to execute a cooperative process.

BACKGROUND ART

Recently, there are household electric devices that execute a cooperative process within a user's home. Such household electric devices, through the execution of a cooperative process, offer a sense of increased convenience to users. In one example of a cooperative process, a DVD (Digital Versatile Disc) player performs disc playback and a television broadcast receiver performs switching between different video input sources.

In the above-described cooperative process, the DVD player first receives a disc playback instruction from a user. Then, the DVD players commences disc playback and outputs, to the television broadcast receiver, video images obtained through disc playback and an AV/C (Audio Video Control) command, which urges the television broadcast receiver to use external input as the video input source (Non-Patent Literature 1). Upon receiving the AV/C command, the television broadcast receiver switches to using external input that is connected with the DVD player as the video input source, and displays video images output from the DVD player on a display.

The DVD player and the television broadcast receiver executing the cooperative process as described above allows the user to enjoy video images played back by the DVD player on the television broadcast receiver without having to perform any user operation for controlling the television broadcast receiver. Meanwhile, it should be noted that in the above-described example, the DVD player and the television broadcast receiver need to be programmed in advance to execute the cooperative process.

CITATION LIST

[Non-Patent Literature]
[Non-Patent Literature 1]
Takeshi Saito and Hiroshi Isozaki, "Home Network Content Protection," Toshiba Corporation, Toshiba Review Vol. 58 No. 6, Jun. 1, 2003, pp. 12-15

SUMMARY

Technical Problem

Non-Patent Literature 1 only discloses cooperative processes executed by specific combinations of devices that are programmed in advance to execute cooperative processes. One example of such specific combination of devices is the combination of the DVD player and the television broadcast receiver described above.

However, a combination of household electric devices that a user possesses differs from that possessed by another user. Thus, in order to realize cooperative processes by any combination of household electric devices possessed by users, each and every household electric device would need to be programmed in advance to execute cooperative processes in collaboration with various other household electric devices. This is impractical since, due to there existing various possible combinations of household electric devices that may be used in combination in user homes, each household electric device would need to store therein a program of enormous size to execute cooperative processes in collaboration with each and every other household electric device that may be used in combination therewith.

In view of this problem, the present disclosure provides a cooperative process execution method for enabling execution of a cooperative process that is suitable for a combination of household electric devices possessed by a user, which differs between different users.

Solution to Problem

One aspect of the present disclosure is a cooperative process execution method for causing household electric devices that are registered to a server to execute cooperative processes. In the cooperative process execution method pertaining to one aspect of the present disclosure, the server stores correspondence information associating a particular operation to be executed by a particular household electric device with one or more groups each composed of one or more household electric devices, and indicating, for each of the one or more household electric devices in each of the groups, a control signal to be transmitted to the household electric device. The cooperative process execution method pertaining to one aspect of the present disclosure includes: detecting whether or not the particular operation is executed; selecting one of the groups that is composed of one or more household electric devices that are registered to the server by referring to the correspondence information, the selecting executed when the detecting detects the execution of the particular operation; and transmitting the control signal to each of the one or more household electric devices in the selected group.

Advantageous Effects

Due to this, the cooperative process execution method pertaining to one aspect of the present disclosure determines operations to be executed by household electric devices in accordance with combinations of household electric devices that are registered to the server. Thus, the cooperative process execution method pertaining to one aspect of the present disclosure achieves execution of a cooperative process that is suitable for a combination of household electric devices possessed by a user, which differs between different users.

BRIEF DESCRIPTION OF DRAWINGS

FIG. 3 illustrates an example of a device information table.

FIG. 4 illustrates an example of a cooperative process composition table.

FIG. 6 illustrates one example of a device operation table.

FIG. 9 illustrates an execution control table pertaining to embodiments 1 and 2.

FIG. 16 illustrates an example of a cooperative process composition table pertaining to one modification.

FIG. 18 illustrates an example of operation record information pertaining to one modification.

FIG. 21 illustrates a multiple cooperative process composition table pertaining to one modification.

FIG. 23 illustrates GUIs pertaining to embodiments 1 and 2 and one modification.

FIG. 24 illustrates GUIs pertaining to one modification.

DESCRIPTION OF EMBODIMENTS

1. Embodiment 1

1.1 Overview

In the following, description is provided on a cooperative process execution system 1 pertaining to embodiment 1, with reference to the accompanying drawings. The cooperative process execution system 1 executes cooperative processes. Note that in the present disclosure, a cooperative process refers to a group of operations linked together that are each executed by a different one of a plurality of household electric devices.

The cooperative process execution system 1 realizes a cooperative process by a server detecting execution of a particular operation by a particular household electric device and controlling each of one or more household electric devices to execute an operation that is associated in advance with the particular operation. Note that in the following, a household electric device executing a particular operation triggering a cooperative process is referred to as a "particular household electric device". Note that household electric devices in the cooperative process execution system 1 need not be capable of directly communicating with one another, provided that they are capable of communicating with the server.

Figure 1:
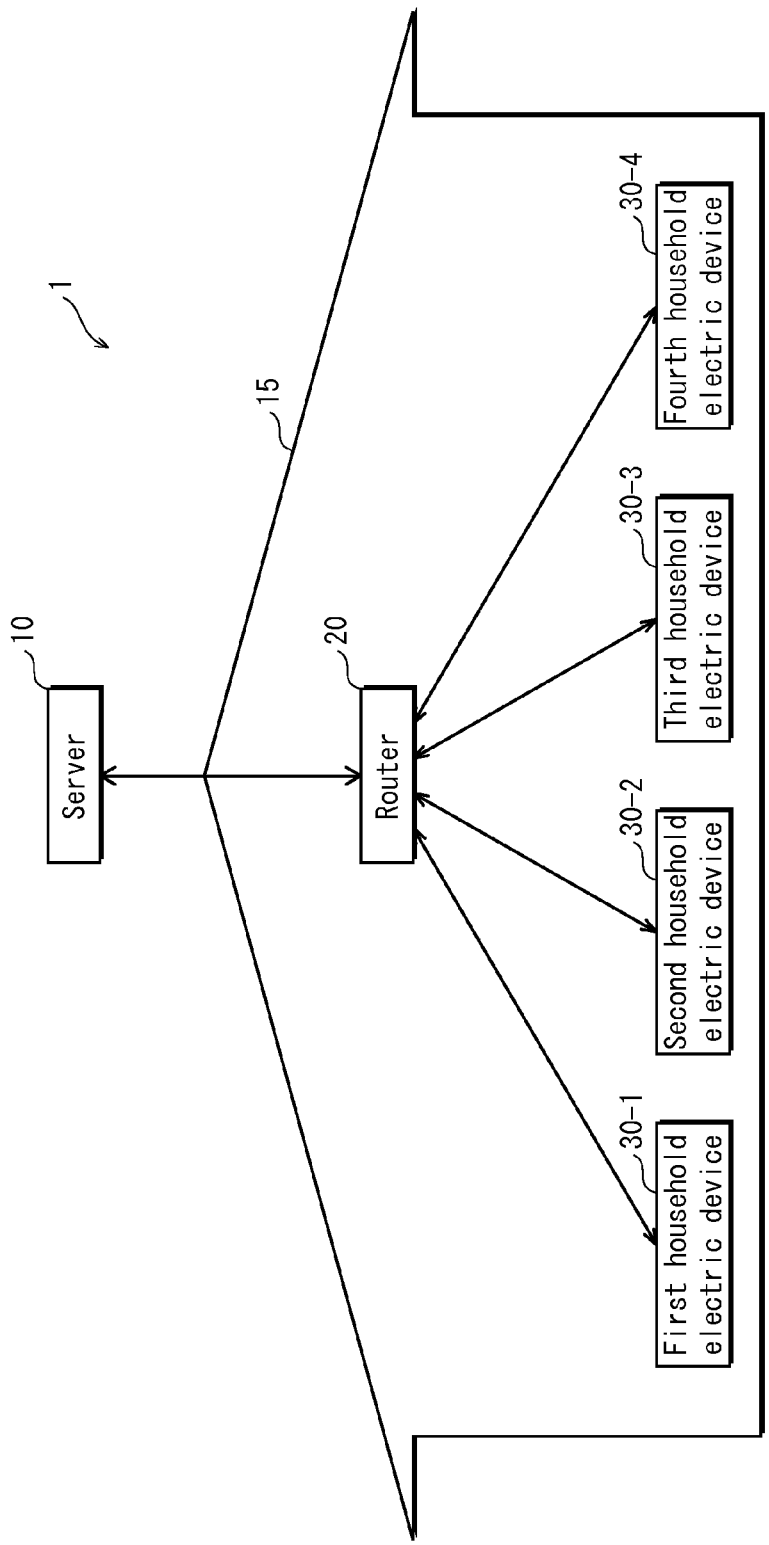
FIG. 1 illustrates a configuration of a cooperative process execution system pertaining to embodiment 1.

As illustrated in FIG. 1, the cooperative process execution system 1 includes: a router 20; a first household electric device 30-1; a second household electric device 30-2; a third household electric device 30-3; a fourth household electric device 30-4; and a server 10. The router 20 and the household electric devices 30-1 through 30-4 are located inside a user home 15. The server 10 is not located in the home 15, but is connected to the router 20 via a network. The first household electric device 30-1 is a smartphone. The second household electric device 30-2, the third household electric device 30-3, and the fourth household electric device 30-4 are an air conditioner, a rice cooker, and a washing machine, respectively.

1.2 Server 10

The server 10 executes cooperative processes by controlling household electric devices registered thereto (e.g., the household electric devices 30-1 through 30-4). In the following, description is provided on the server 10.

1.2.1 Configuration

Figure 2:
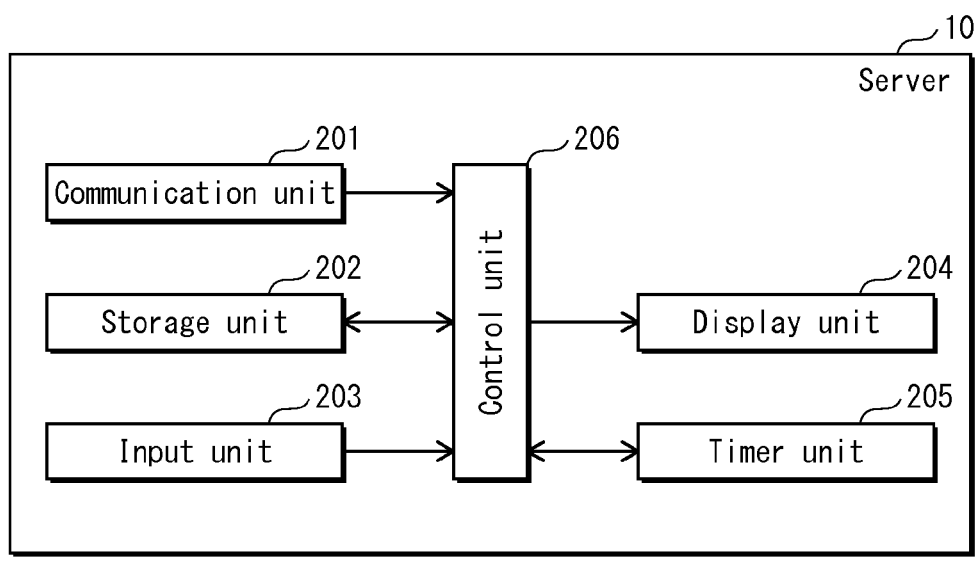
FIG. 2 is a block diagram illustrating a configuration of a server pertaining to embodiment 1.

The server 10 is implemented by using a computer. As illustrated in FIG. 2, the server 10 includes the following functional units: a communication unit 201; a storage unit 202; an input unit 203; a display unit 204; a timer unit 205; and a control unit 206.

(1) Communication Unit 201

The communication unit 201 is implemented by using a communication LSI, and is connected to the router 20 via the network. The communication 201 exchanges (transmits and receives) data with the household electric devices 30-1 through 30-4 via the network and the router 20.

(2) Storage Unit 202

The storage unit 202 is implemented by using a non-volatile recording medium such as a flash memory or a hard disk drive. The storage unit 202 stores data therein. For example, the storage unit 202 stores therein a device information table, an example of which is illustrated in FIG. 3, and a cooperative process composition table, an example of which is illustrated in FIG. 4. The device information table and the cooperative process composition table are described in detail in the following.

(3) Input Unit 203

The input unit 203 is implemented by using an input device such as a keyboard or the like. The input unit 203 acquires a user instruction, and notifies the control unit 206 of the user instruction. The user instruction is input by the user via the keyboard or the like.

(4) Display Unit 204

The display unit 204 is implemented by using a display and a display control LSI. The display may be a liquid crystal display. The display control LSI acquires video data, and causes video of the acquired video data to be displayed on the display.

(5) Timer Unit 205

The timer unit 205 is implemented by using a real time clock IC (integrated circuit). The timer unit 205 measures time, receives a specification of time, and provides an alarm notification to the control unit 206 when the specified time arrives.

(6) Control Unit 206

The control unit 206 is implemented by using at least a processor and a memory. The control unit 206 has overall control over the operation of the server 10. The control unit 206 performs the functions provided thereto by the processor executing one or more programs stored in the memory.

Major ones of the functions provided to the control unit 206 include: a cooperative process specification function; a cooperative control function; and a device registration function.

(A) Cooperative Process Specification Function

The cooperative process specification function is a function of specifying an execution target cooperative process. In specific, the control unit 206 detects execution of the particular operation by the particular household electric device included in the cooperative process execution system 1 and specifies an execution target cooperative process in accordance with the particular operation so detected. Processing in the cooperative process specification function corresponds to the processing in Step S722 in FIG. 7 and the processing in FIG. 8.

(B) Cooperative Control Function

The cooperative control function is a function of controlling household electric devices to execute a cooperative process specified through the cooperative process specification function. Processing in the cooperative control function corresponds to processing in Steps S723 through S726 in FIG. 7.

(C) Device Registration Function

The device registration function is a function of registering and thereby specifying household electric devices currently included in the cooperative process execution system 1. The device registration function is realized as follows. The control unit 206, when receiving a registration request from a household electric device, writes information indicating a registered state (e.g., a value "1") to a registration state field for the household electric device in the device information table (refer to FIG. 3). The device information table, in addition to information on household electric devices that are currently included in the cooperative process execution system 1, includes information on household electric devices that are not currently included in the cooperative process execution system 1 but may be later included in the cooperative process execution system 1. Further, the device information table has written therein, in a registration state field for a household electric device not currently included in the cooperative process execution system 1, information indicating a not-registered state (e.g., a value "0").

Note that the control unit 206 cancels registration of a household electric device to the server 10 by receiving a registration cancellation request including a device ID from the household electric device and writing information indicating a not-registered state (e.g., a value "0") to a registration state field for the household electric device.

1.2.2 Data Structure (1) Device Information Table

As illustrated in FIG. 3, the device information table is a table including, for each household electric device that is and may be included in the cooperative process execution system 1, (i) a device ID, (ii) a product code, (iii) a software version, (iv) one or more operation IDs, (v) one or more control commands, and (vi) a registration state. Such information corresponding to each household electric device is in an associated state. Note that in FIG. 3, the bracketed information, i.e., product name, product type, and processing name, is provided for the sake of explanation, and need not be actually written in the device information table. In the following, description is provided on each type of information included in the device information table based on one household electric device.

The device ID is the identification number given to the household electric device.

The device name indicates the name of the household electric device.

The product code is an identifier given to the household electric device by the manufacturer of the household electric device. Typically, the same product code is given to all household electric devices having the same structure. The product code is a combination of letters (characters), numbers, symbols, etc. The product type indicates the type of household electric device to which the household electric device belongs.

The software version is a number indicating a version of software (can also be firmware, middleware, or the like) for controlling the household electric device, and is given to the software by a software developer or the like. Typically, when a software is updated from an older version to a newer version, a number greater than that given to the older version is given to the newer, updated version of the software.

The one or more operation IDs each identify an operation that the household electric device is capable of executing. The operation name is the name given to the operation indicated by the corresponding operation ID.

The one or more control commands correspond one-to-one with the operations indicated by the operation IDs, and each are a command for instructing execution of the corresponding operation. Here, note that the server 10 performs management of all control commands for instructing household electric devices to execute operations, and is responsible of notifying households devices of control commands. Due to this, household electric devices need not store control commands for other household electric devices or communicate with other household electric devices in the execution of cooperative processes.

Here, a control command may include a parameter necessary for the household electric device to execute the corresponding operation. For example, the parameter may be a specification of time.

The registration state is information indicating whether or not the household electric device is registered. A value of "1" in the registration state field indicates a registered state, whereas a value of "0" in the registration state field indicates a not-registered state.

In the following, description is provided on a specific example of the device information table, with reference to FIG. 3. In the device information table illustrated in FIG. 3, row 311 indicates that the first household electric device 30-1, which is identified by device ID "1", has a product code "P-06D", and stores software identified by a version number "1.12". Row 311 also indicates that the first household electric device 30-1 is capable of executing the operations written in the operation ID (operation name) field, which in this case include a power ON operation and an alarm operation. The power ON operation is provided with operation ID "A1". Further, the control command for causing the first household electric device 30-1 to execute the power ON operation is "D201xxxx". Note that the part "xxxx" of each control command indicates data of variable length, whose content may also vary. That is, information necessary for a household electric device to execute the corresponding operation, such as a parameter value, is written in the "xxxx" part of the control command.

The alarm operation is provided with operation ID "A2". The control command for causing the first household electric device 30-1 to execute the alarm operation is "D205xxxx". Finally, according to row 311, the first household electric device 30-1 is registered to the server 10 due to a value "1" in the registration state field.

Row 312 indicates that the second household electric device 30-2, which is identified by device ID "2", has a product code "CS-X252C", and stores software identified by a version number "1.01". Row 312 also indicates that the second household electric device 30-2 is capable of executing the operations specified in the operation ID (operation name) field, which in this case include a power ON operation, high-power mode operation, and power-saving mode operation.

The power ON operation is provided with operation ID "B1". Further, the control command for causing the second household electric device 30-2 to execute the power ON operation is "9203xxxx".

The high-power mode operation is provided with operation ID "B2". Further, the control command for causing the second household electric device 30-2 to execute the high-power mode operation is "9252xxxx".

The power-saving mode operation is provided with operation ID "B3". Further, the control command for causing the second household electric device 30-2 to execute the power-saving mode operation is "9280xxxx". In addition, the second household electric device 30-2 is registered to the server 10 due to a value "1" in the registration state field.

Row 313 indicates that the third household electric device 30-3, which is identified by device ID "3", has a product code "SR-SX102", and stores software identified by a version number "1.03". Row 313 also indicates that the third household electric device 30-3 is capable of executing the operations specified in the operation ID (operation name) field, which in this case include a power ON operation and a rice cooking start operation. The power ON operation is provided with operation ID "C1", and the rice cooking start operation is provided with operation ID "C2". In addition, the third household electric device 30-3 is registered to the server 10 due to a value "1" in the registration state field.

Row 314 indicates that the fourth household electric device 30-4, which is identified by device ID "4", has a product code "NA-VX8200L", and stores software identified by a version number "1.10". Row 414 also indicates that the fourth household electric device 30-4 is capable of executing the operations specified in the operation ID (operation name) field, which in this case includes a power ON operation and a washing start operation. The power ON operation is provided with operation ID "D1", and the washing start operation is provided with operation ID "D2". In addition, the fourth household electric device 30-4 is registered to the server 10 due to a value "1" in the registration state field.

Row 315 indicates that the fifth household electric device, which is identified by device ID "5", has a product code "DMC-TZ40", and stores software identified by a version number "1.00". Row 315 also indicates that the fifth household electric device is capable of executing the operations specified in the operation ID (operation name) field, which in this case include a power ON operation and an image capture operation. The power ON operation is provided with operation ID "E1", and the image capture operation is provided with operation ID "E2". In addition, the fifth household electric device is not registered to the server 10 due to a value "0" in the registration state field. Note that when the user later purchases the fifth household electric device, places the fifth household electric device inside the home 15, and registers the fifth household electric device to the server 10, the value "0" in the registration state field will be replaced with the value "1". Then, the fifth household electric device will be capable of participating in cooperative processes with other household electric devices.

Note that specific description on the sixth through ninth household electric devices, which are identified by device IDs "6" through "9" and correspond to rows 316 through 319 in the device information table illustrated in FIG. 3, is not provided in the following, to avoid description similar to that on the fifth household electric device, which is identified by device ID "5", being repeated.

(2) Cooperative Process Composition Table

As illustrated in FIG. 4, the cooperative process composition table indicates, for each cooperative process to be executed by household electric devices included in the cooperative process execution system 1, a correspondence between a first operation that triggers the cooperative process and the rest of the operations included in the cooperative process (referred to in the following as the "remaining processing"). Note that in the following, the term "device group for remaining processing" refers to a group of devices that execute operations included in the remaining processing. Further, in the following, description is provided on the cooperative process composition table illustrated in FIG. 4 based on one cooperative process.

Each operation (first, second, third, and fourth operations) in the cooperative process is specified by a combination of a device ID of a household electric device executing the operation and an operation ID identifying the operation. Note that when the device ID field and the operation ID field are blank for the third operation and/or the fourth operation, the third operation and/or the fourth operation is not performed and the corresponding cooperative process is composed of less than four operations.

Note that the cooperative process composition table not only includes information on cooperative processes to be executed by household electric devices registered to the server 10, but also includes information on cooperative processes including operations to be executed by household electric devices that may be later registered to the server 10.

The device IDs are identification numbers given to household electric devices that execute operations included in the cooperative process. The operation IDs identify operations composing the cooperative process.

In the following, description is provided on a specific example of the cooperative process composition table, with reference to FIG. 4. In the cooperative process composition table illustrated in FIG. 4, the first cooperative process is composed of a first operation, a second operation, and a third operation. A household electric device identified by device ID "1" executes the first operation, which is identified by operation ID "A2". Thus, the first household electric device 30-1, which is identified by device ID "1", executes the alarm operation, which is identified by operation ID "A2", as the first operation (refer to FIG. 3).

A household electric device identified by device ID "2" executes the second operation, which is identified by operation ID "B3". Thus, the second household electric device 30-2, which is identified by device ID "2", executes the power-saving mode operation, which is identified by operation ID "B3", as the second operation.

A household electric device identified by device ID "3" executes the third operation, which is identified by operation ID "C2". Thus, the third household electric device 30-3, which is identified by device ID "3", executes the rice cooking start operation, which is identified by operation ID "C2", as the third operation.

As such, the first cooperative process is composed of the alarm operation of the first household electric device 30-1, the power-saving mode operation of the second household electric device 30-2, and the rice cooking start operation of the third household electric device 30-3.

1.3 Electric Devices 30-1, 30-2, 30-3, 30-4

The first household electric device 30-1, the second household electric device 30-2, the third household electric device 30-3, and the fourth household electric device 30-4 are household electric devices that execute operations included in cooperative processes. Each of the household electric devices 30-1 through 30-4 has a unique function unit 506 that realizes a unique function provided thereto (a telephone function in the case of a smartphone, a cooler function in the case of an air-conditioner, a rice cooking function in the case of a rice cooker, a washing function in the case of a washing machine, or the like). Note that other than having different unique function units 506, the household electric devices 30-1 through 30-4 have similar structures. As such, in the following, description on the unique function unit 506 is provided for each of the household electric devices 30-1 through 30-4, while description on other structural components is provided based on the first household electric device 30-1.

1.3.1 Configuration

Figure 5:
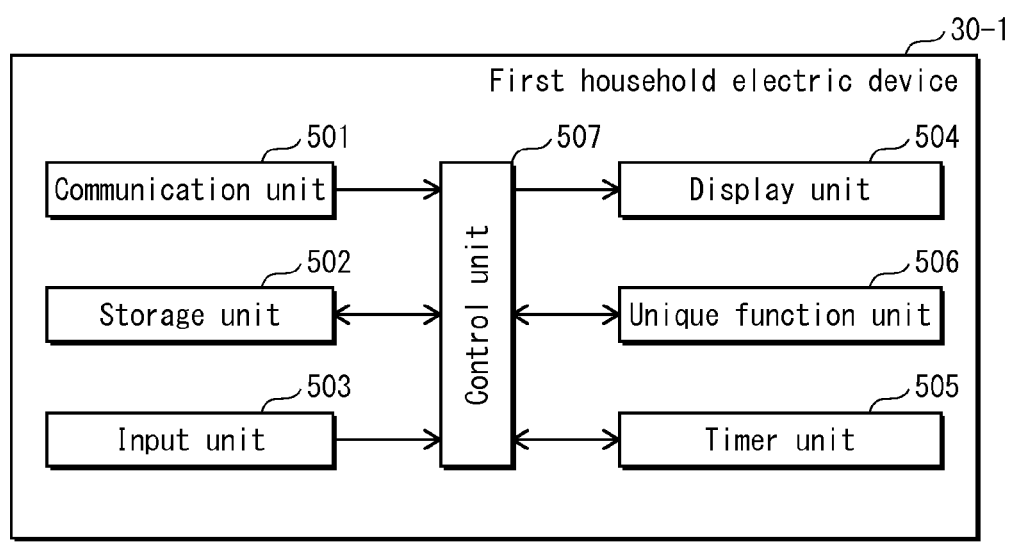
FIG. 5 is a block diagram illustrating a configuration of a first household electric device pertaining to embodiment 1.

As illustrated in FIG. 5, the first household electric device 30-1 includes: a communication unit 501; a storage unit 502; an input unit 503; a display unit 504; a timer unit 505; a unique function unit 506; and a control unit 507.

(1) Communication Unit 501

The communication unit 501 is implemented by using a communication LSI. The communication unit 501 transmits and receives data via a network.

(2) Storage Unit 502

The storage unit 502 is implemented by using a non-volatile recording medium such as a flash memory or a hard disk drive. The storage unit 502 stores data therein. The storage unit 502 stores a device operation table (refer to FIG. 6). Note that each of the household electric devices 30-1 through 30-4 has a device operation table, which is a list of operations that the household electric device executes when receiving a user instruction from the user or an execution instruction from the server 10. The content of the device operation table differs between different household electric devices. The device operation table will be described in detail in the following.

(3) Input Unit 503

The input unit 503 is composed of an input device such as a combination of a remote controller and a light receiver for receiving remote controller signals, a touch panel, or a key pad. The input unit 503 acquires a user instruction and notifies the control unit 507 of the user instruction so acquired. The user instruction is input by the user via the remote controller, the touch panel, the key pad, or the like.

(4) Display Unit 504

The display unit 504 is implemented by using a display and a display control LSI. The display may be a liquid crystal display. The display control LSI acquires video data, and causes video of the acquired video data to be displayed on the display.

(5) Timer Unit 505

The timer unit 505 is implemented by using a real time clock IC. The timer unit 505 measures time, receives a specification of time, and provides an alarm notification when the specified time arrives.

(6) Unique Function Unit 506

The unique function unit 506 in each of the household electric devices 30-1 through 30-4 realizes a function unique to the household electric device. Thus, the unique function unit 506 has different functions in each of the household electric devices 30-1 through 30-4. In the following, description is provided on the unique function unit 506 for each of the household electric devices 30-1 through 30-4.

(A) Unique Function Unit 506 in First Household Electric Device 30-1

The first household electric device 30-1 is a smartphone as already discussed above, and has, as main functions thereof, a power ON function, an alarm function, a power OFF function, a camera photography function, a telephone function, a digital television (TV) broadcast reception function, and a webpage display function, for example.

The power ON function is a function of, based on a control command instructing execution of the power ON operation, turning ON the first household electric device 30-1. The alarm function is a function of, based on a control command instructing execution of the alarm operation, which includes a specification of time as a parameter, providing a notification to the user when the present time equals the specified time. The notification is provided in the form of sound, vibration of a vibrator, or the like.

The power OFF function is a function of, based on a control command instructing execution of a power OFF operation, turning OFF the first household electric device 30-1. The camera photography function is a function of, based on a control command instructing execution of a camera photography operation, capturing an image by using a camera.

The telephone function is a function of, based on a control command instructing execution of a telephone operation, which includes a telephone number as a parameter, making an outgoing call or receiving an incoming call. The digital TV broadcast reception function is a function of, based on a control command instructing execution of digital TV broadcast reception, which includes a channel number, etc., as parameters, receiving and demodulating digital TV broadcast, and causing the display unit 504 to display the video obtained.

The webpage display function is a function of, based on a control command instructing execution of displaying of a webpage, which includes connection destination information such as a URL (Uniform Resource Locator) as a parameter, receiving a webpage from an address indicated by the URL, and causing the display unit 504 to display the webpage.

Note that in addition to the functions described above, the first household electric device 30-1 has other functions that typical smartphones have, and such other functions are also realized by the unique function unit 506.

Further, note that a list of such unique functions of the first household electric device 30-1 is included in the device operation table that is stored in the storage unit 502 of the first household electric device 30-1.

(B) Unique Function Unit 506 in Second Household Electric Device 30-2

The second household electric device 30-1 is an air-conditioner as already discussed above, and has, as main functions thereof, a power ON function, a high-power mode operation function, a power-saving mode operation function, a temperature setting function, an ON timer function, a power OFF function, a cooler function, a heater function, an OFF timer function, a wind direction setting function, and an air volume setting function, for example.

The power ON function is a function of, based on a control command instructing execution of the power ON operation, turning ON the second household electric device 30-2.

The high-power mode operation function is a function of, based on a control command instructing execution of the high-power mode operation, performing cooling so that temperature inside the room falls rapidly compared to when performing normal cooling. Note that although description is provided in the following based on the premise that the high-power mode operation function is used for cooling, the high-power mode operation function may be used for heating.

The power-saving mode operation function is a function of, based on a control command instructing execution of the power-saving mode operation, performing cooling that is more effective than normal cooling, for example, by detecting human position and performing cooling focusing on the area around the position.

The temperature setting function is a function of, based on a control command instructing execution of a temperature setting operation, which includes a specification of temperature as a parameter, executing the cooler function or the heater function such that the temperature in the room equals the specified temperature. The ON timer function is a function of, based on a control command instructing execution of an ON timer operation, which includes a power ON time as a parameter, turning ON the second household electric device 30-2 when the present time equals the power ON time.

The power OFF function is a function of, based on a control command instructing execution of a power OFF operation, turning OFF the second household electric device 30-2. The cooler function is a function of, based on a control command instructing execution of a cooling operation, driving a cooler mechanism of the second household electric device 30-2. The heater function is a function of, based on a control command instructing execution of a heating operation, driving a heater mechanism of the second household electric device 30-2. The OFF timer function is a function of, based on a control command instructing execution of an OFF timer operation, which includes a power OFF time as a parameter, turning OFF the second household electric device 30-2 when the present time equals the power OFF time.

The wind direction setting function is a function of, based on a control command instructing execution of a wind direction setting operation, which includes information specifying a wind direction as a parameter, adjusting wind direction to the specified wind direction. The air volume setting function is a function of, based on a control command instructing execution of an air volume setting operation, which includes information specifying air volume as a parameter, adjusting air volume to the specified air volume.

Note that in addition to the functions described above, the second household electric device 30-2 has other functions that typical air conditioners have, and such other functions are also realized by the unique function unit 506.

Further, note that a list of such unique functions of the second household electric device 30-2 is included in the device operation table that is stored in the storage unit 502 of the second household electric device 30-2.

(C) Unique Function Unit 506 in Third Household Electric Device 30-3

The third household electric device 30-3 is a rice cooker as already discussed above, and has, as main functions thereof, a power ON function, a rice cooking start function for starting rice cooking, a power OFF function, and a rice cooking completion time setting function, for example.

The power ON function is a function of, based on a control command instructing execution of the power ON operation, turning ON the third household electric device 30-3. The rice cooking start function is a function of performing rice cooking.

The power OFF function is a function of, based on a control command instructing execution of a power OFF operation, turning OFF the third household electric device 30-3. The rice cooking completion time setting function is a function of, based on a control command instructing execution of a rice cooking completion time setting operation, which includes a rice cooking completion time as a parameter, calculating a rice cooking start time by calculating the difference between the rice cooking completion time and the time required for rice cooking, and performing control such that rice cooking is started when the present time equals the rice cooking start time.

Note that in addition to the functions described above, the third household electric device 30-3 has other functions that typical rice cookers have, and such other functions are also realized by the unique function unit 506.

Further, note that a list of such unique functions of the third household electric device 30-3 is included in the device operation table that is stored in the storage unit 502 of the third household electric device 30-3.

(D) Unique Function Unit 506 in Fourth Household Electric Device 30-4

The fourth household electric device 30-4 is a washing machine as already discussed above, and has, as main functions thereof, a power ON function, a washing start function, a power OFF function, a washing time setting function, and a washing completion time setting function, for example.

The power ON function is a function of, based on a control command instructing execution of the power ON operation, turning ON the fourth household electric device 30-4. The washing start function is a function of, based on a control command instructing execution of a washing start operation, starting washing.

The power OFF function is a function of, based on a control command instructing execution of a power OFF operation, turning OFF the fourth household electric device 30-4. The washing time setting function is a function of, based on a control command instructing execution of a washing time setting operation, which includes information specifying a time as a parameter, making a configuration such that washing is performed for the specified time.

The washing completion time setting function is a function of, based on a control command instructing execution of a washing completion time setting operation, which includes a washing completion time as a parameter, calculating a washing start time by calculating the difference between the washing completion time and the time required for washing, and performing control such that washing is started when the present time equals the washing start time.

Note that in addition to the functions described above, the fourth household electric device 30-4 has other functions that typical washing machines have, and such other functions are also realized by the unique function unit 506.

Further, note that a list of such unique functions of the fourth household electric device 30-4 is included in the device operation table that is stored in the storage unit 502 of the fourth household electric device 30-4.

(7) Control Unit 507

The control unit 507 is implemented by using at least a processor and a memory. The control unit 507 has overall control over the operations of the first household electronic device 30-1. The control unit 507 performs the following functions by the processor executing one or more programs stored in the memory.

Major ones of the functions provided to the control unit 507 include: an operation list display function; an information transmission function; a unique function unit control function; and a registration request function. Such functions are explained one by one in the following.

(A) Operation List Display Function

The operation list display function is a function of, based on a user instruction input to the first household electric device 30-1, displaying a list of operations that the first household electric device 30-1 is capable of executing. The processing in the execution of the operation list display function corresponds to processing in Step S711 in FIG. 7.

(B) Information Transmission Function

The information transmission function is a function of transmitting to the server 10 information related to an operation whose execution has been instructed by a user instruction. The information that is transmitted to the server 10 includes device information and execution information. The device information includes a device ID identifying the first household electric device 30-1. The execution information includes an operation ID of the operation that has been executed in response to a user instruction. The processing in the execution of the information transmission function corresponds to processing in Step S716 in FIG. 7.

(C) Unique Function Unit Control Function

The unique function unit control function includes that based on a user instruction and that based on an execution instruction. In the following, description is provided on each of such functions.

(C-1) Unique Function Unit Control Function Based on User Instruction

The unique function unit control function based on a user instruction is a function of specifying an execution target operation based on a user instruction having been received, and transmitting a control command instructing the unique function unit 506 to execute the specified operation. The correspondence between the operation ID identifying the specified operation and the control command to be transmitted is defined in the device operation table stored in the storage unit 502.

Figure 7:
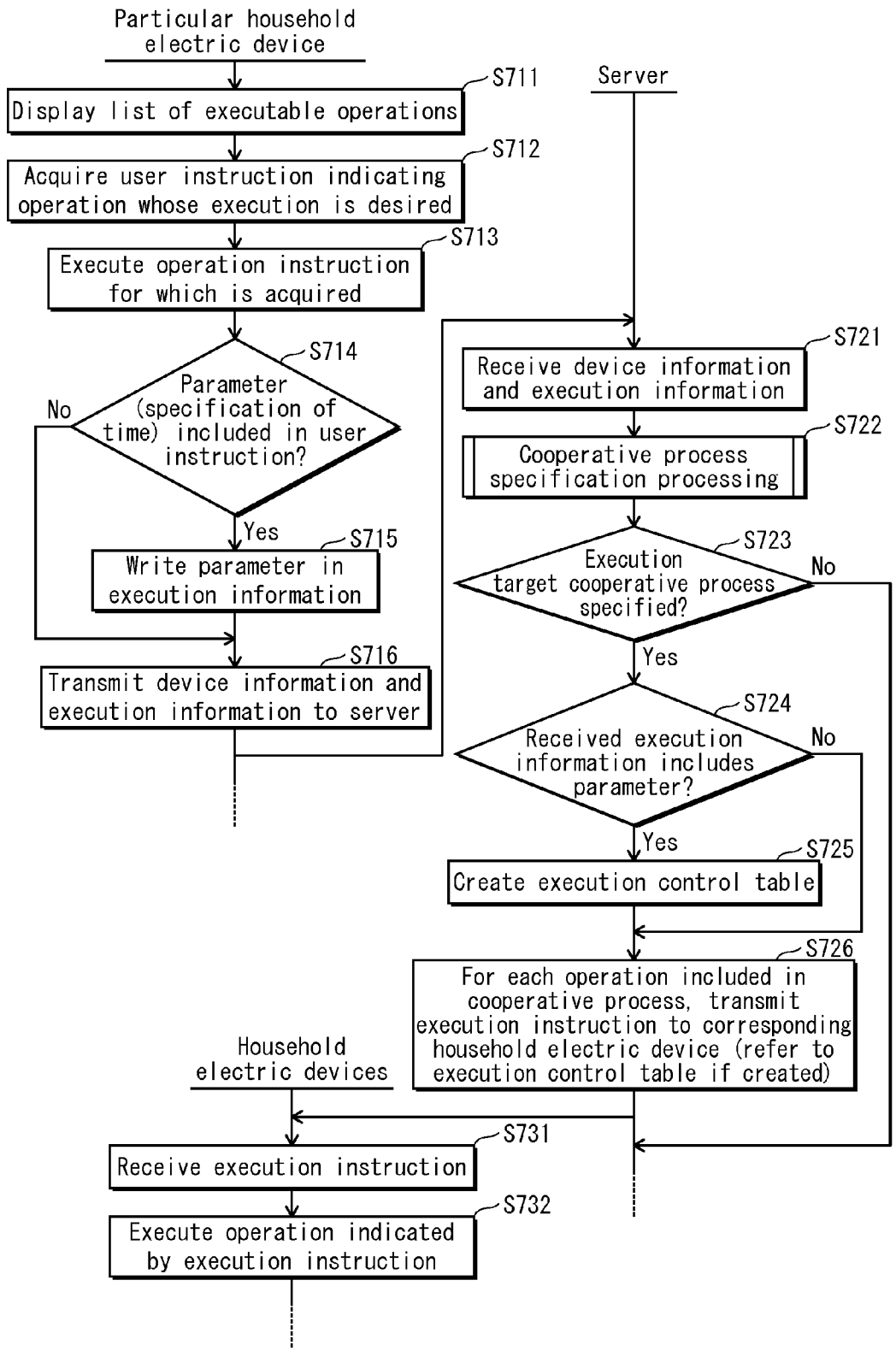
FIG. 7 is a flowchart illustrating a cooperative process pertaining to embodiment 1.

The processing in the execution of the unique function unit control function based on a user instruction corresponds to processing in Steps S712 and S713 in FIG. 7.

(C-2) Unique Function Unit Control Function Based on Execution Instruction

The unique function unit control function based on an execution instruction is a function of instructing the unique function unit 506 to execute an operation whose execution is instructed by a control command received from the server 10, and thereby causing the unique function unit 506 to execute the operation.

The processing in the execution of the unique function unit control function based on an execution instruction corresponds to processing in Step S732 in FIG. 7.

(D) Registration Request Function

The registration request function is a function of, based on a user instruction requesting registration of the first household electric device 30-1 to the server 10, transmitting a device registration request to the server 10.

1.3.2 Data Structure

In the following, description is provided on the device operation table, which is stored in the storage unit 502. The device operation table is a table specifying operations that the household electric device storing the device operation table is capable of executing based on user instructions and control commands transmitted from the server 10. For example, the device operation table stored in the storage unit 502 of the first household electric device 30-1 is illustrated in FIG. 6 as one example of the device operation table. Note that the device operation table of the first household electric device 30-1, which is illustrated in FIG. 6, includes the same information as row 311 in the device information table illustrated in FIG. 3, which corresponds to the first household electric device 30-1.

The device ID is an identification number uniquely provided to the household electric device and identifies the household electric device.

The product code is an identifier given to the household electric device by the manufacturer of the household electric device. Typically, the same product code is given to all household electric devices having the same structure. The product code is a combination of letters (characters), numbers, symbols, etc.

The software version is a number indicating a version of the control software of the household electric device. Typically, each time a software is updated from an older version to a newer version, a number greater than that given to the older version is given to the newer, updated version of the software.

The one or more operation IDs each identify an operation that the household electric device storing the device operation table is capable of executing. The operation name, which is provided for each of the one or more operation IDs, is the name given to the operation indicated by the corresponding operation ID. In the above, description is provided that operation names need not be actually included in the device information table that the server 10 stores. Meanwhile, operation names are included in the device operation tables that household electric devices (e.g., the first household electric device 30-1) store because in the case of the first household electric device 30-1, there are cases where the display unit 504 displays operation names.

The one or more control commands correspond one-to-one with the operation IDs, and each indicate a command instructing execution of the operation indicated by the corresponding operation ID.

For example, the device operation table illustrated in FIG. 6 indicates that the first household electric device 30-1, which is identified by device ID "1", has a product code "P-06D" and stores software identified by a version number "1.12". The device operation table illustrated in FIG. 6 also indicates that the first household electric device 30-1 is capable of executing one or more operations specified in the column listing one or more operation IDs, which in this case include the power ON operation and the alarm operation. The power ON operation is provided with operation ID "A1", and the alarm operation is provided with operation ID "A2".

Note that although illustration is not provided of the device operation table of the second household electric device 30-2, the device operation table of the second household electric device 30-2 includes the same information as row 312 in the device information table illustrated in FIG. 3, which corresponds to the second household electric device 30-2. Similarly, note that the device operation table of the third household electric device 30-3 and the device operation table of the fourth household electric device 30-4 include the same information as row 313 and row 314 in the device information table illustrated in FIG. 3, respectively. Row 313 corresponds to the third household electric device 30-3, and row 314 corresponds to the fourth household electric device 30-4.

1-4. Router 20

The router 20 is a device that connects different networks. As illustrated in FIG. 1, the router 20 in the cooperative process execution system 1 connects an in-home network to which the household electric devices 30-1 through 30-4 belong and an external (out of the home) network to which the server 10 belongs. Note that in the following description, even when not explicitly stated, it is regarded that the communication between the server 10 and the household electric devices 30-1 through 30-4 is always mediated by the router 20.

1.5 Operation

In the following, description is provided on the processing when the cooperative process execution system 1 executes a cooperative process, with reference to FIGS. 7 through 9.

In Step S711, the user inputs an operation list display instruction, which is a user instruction, via the input unit 503 of the particular household electric device included in the cooperative process execution system 1. Note that in the following, description based on an exemplary case is provided as necessary. In the exemplary case, the first household electric device 30-1 is used as an example of the particular household electric device.

The input unit 503 notifies the control unit 507 of the operation list display instruction so input. When acquiring the operation list display instruction, the control unit 507 reads out the device operation table from the storage unit 502. Subsequently, the control unit 507 creates an image showing a list of the operation names in the device operation table. This image is referred to as an operation list image in the following. Further, the control unit 507 outputs data for the operation list image to the display unit 504.

The display unit 504, based on the data for the operation list image acquired from the control unit 507, displays the operation list image on the display. For example, the display of the particular household electric device displays an operation list image listing operation names including "Power ON" and "Alarm" (refer to reference sign 2302 in FIG. 23).

In Step S712, the user of the particular household electric device, by referring to the operation list image being displayed on the display, selects one operation name from among the operation names listed in the operation list image and inputs, via the input unit 503, a user instruction instructing execution of the operation pertaining to the operation name so selected. The input unit 503 transmits the user instruction so input to the control unit 507.

For example, say the user of the particular household electric device has selected the alarm operation as the desired operation. Further, say the user, in addition to selecting the alarm operation, has made via the input unit 503 a specification of the time at which a notification is to be provided to the user when the alarm operation is executed, as a parameter pertaining to the alarm operation. The user instruction transmitted to the control unit 507 from the input unit 503 includes the parameter so input.

In Step S713, the control unit 507 provides the unique function unit 506 with an instruction instructing execution of the operation indicated by the acquired user instruction. The unique function unit 506 executes the operation indicated by the user instruction.

For example, when receiving a user instruction instructing execution of the alarm operation, the control unit 507 provides the unique function unit 506 with an instruction instructing execution of the alarm operation. The unique function unit 506, by executing the alarm operation, sets the time specified by the parameter included in the user instruction to the timer unit 505.

In consequence, the unique function unit 506, when receiving a notification from the timer unit 505 that the present time has equaled the specified time, provides a notification to the user in the form of sound, vibration of a vibrator, or the like.

In Step S714, the control unit 507 generates device information including the device ID of the particular household electric device, which is included in the device operation table, and generates execution information including the operation ID of the operation indicated by the user instruction and the parameter included in the user instruction (Step S715). Further, the control unit 507 transmits the device information and the execution information to the server 10 via the communication unit 501 (Step S716).

For example, the device information includes device ID "1", which indicates the first household electric device 30-1. Further, for example, the execution information includes operation ID "A2", which indicates the alarm operation, and also includes a parameter indicating a specification of time.

In Step S721, the communication unit 201 of the server 10 receives the device information and the execution information from the particular household electric device.

When the communication unit 201 receives the device information and the execution information, the control unit 206 executes cooperative process specification processing in Step S722, based on the device information and the execution information.

In the following, description is provided on details of the cooperative process specification processing, with reference to FIG. 8.

In Step S811, the control unit 206 selects one cooperative process from the cooperative process composition table. The cooperative process selected in Step S811 is a judgment target cooperative process, with respect to which a judgment is made of whether or not the cooperative process is to be executed. In Step S811, the first cooperative process, which is first in the cooperative process composition table, is selected.

In Step S812, a judgment is performed of whether or not the device ID and the operation ID of the first operation in the judgment target cooperative process match the device ID included in the device information and the operation ID included in the execution information, respectively. When the device IDs and the operation IDs match ("Yes" in Step S812), processing proceeds to Step S813. On the other hand, when the device IDs and the operation IDs do not match ("No" in Step S812), processing proceeds to Step S815.

In Step S812, when the device information includes device ID "1" and the execution information includes operation ID "A2", which respectively match the device ID and the operation ID of the first operation in the judgment target cooperative process, the judgment result is "Yes".

In Step S813, the control unit 206 refers to the device information table and judges whether or not all of the household electric devices included in the device group for the remaining processing in the judgment target cooperative process are registered to the server 10. When the result of this judgment is affirmative ("Yes" in Step S813), processing proceeds to Step S814. On the other hand, when the result of this judgment is negative ("No" in Step S813), processing proceeds to Step S815.

For example, say device IDs "2" and "3" are associated with the remaining processing (the second and third operations) in the first cooperative process group. In this example, according to the device information table illustrated in FIG. 3, the household electric devices identified by the device IDs "2" and "3" are registered to the server 10. Thus, in this example, the result of the judgment in Step S813 is affirmative.

In Step S814, the control unit 206 stores the cooperative process for which the result of the judgment in Step S813 is affirmative as a candidate execution target cooperative process.

In Step S815, the control unit 206 judges whether one or more of the cooperative processes specified in the cooperative process composition table are still remaining unselected as the judgment target cooperative process. When the result of this judgment is affirmative ("Yes" in Step S815), processing proceeds to Step S816. On the other hand, when the result of this judgment is negative ("No" in Step S815), processing proceeds to Step S821.

In Step S816, the control unit 206 selects, from among the cooperative processes specified in the cooperative process composition table, one cooperative process that is still remaining unselected as the judgment target cooperative process, and processing proceeds to Step S812.

For example, when the judgment in Steps S812 through S814 have been performed with respect to the first cooperative process, the second cooperative process is selected as the judgment target cooperative process in Step S816.

In Step S821, the control unit 206 judges whether at least one of the cooperative processes in the cooperative process composition table has been judged as being a candidate execution target cooperative process. When none of the cooperative processes in the cooperative process composition table have been judged as being a candidate execution target cooperative process ("No" in Step S821), processing is terminated ("RETURN"). On the other hand, when at least one of the cooperative processes in the cooperative process composition table has been judged as being a candidate execution target cooperative process ("Yes" in Step S821), processing proceeds to Step S822.

In Step S822, the control unit 206 judges whether two or more of the cooperative processes in the cooperative process composition table have been judged as being candidate execution target cooperative processes. When it is judged that two or more of the cooperative processes in the cooperative process composition table have been judged as being candidate execution target cooperative processes ("Yes" in Step S822), processing proceeds to Step S823. On the other hand, when it is judged that only one of the cooperative processes in the cooperative process composition table has been judged as being a candidate execution target cooperative process ("No" in Step S822), processing proceeds to Step S824.

In Step S823, the control unit 206 specifies, as the execution target cooperative process, one of the two or more candidate execution target cooperative processes whose device group for remaining processing includes the greatest number of household electric devices. Note that in Step S823, when two or more candidate execution target cooperative processes have device groups for remaining processing including the same number of devices, the control unit 206 specifies, as the execution target cooperative process, the cooperative process having been set as a candidate execution target cooperative process in an earlier iteration of the processing in Step S814, and terminates the cooperative process specification processing ("RETURN").

In Step S824, the control unit 206 specifies, as the execution target cooperative process, the cooperative process having been judged as being a candidate execution target cooperative process in Step S814, and terminates the cooperative process specification processing ("RETURN").

This concludes the description on the cooperative process specification processing. In the following, description is provided from Step S723 and on.

In Step S723, a judgment is made of whether or not the execution target cooperative process has been specified through the cooperative process specification processing. When the execution target cooperative process has not been specified through the cooperative process specification processing ("No" in Step S723), processing is terminated. On the other hand, when the execution target cooperative process has been specified through the cooperative process specification processing ("Yes" in Step S723), processing proceeds to Step S724.

In Step S724, a judgment is made of whether or not the execution information having been received includes a parameter. When the execution information does not include a parameter ("No" in Step S724), processing proceeds to Step S726. On the other hand, when the execution information includes a parameter ("Yes" in Step S724), an execution control table is created (Step S725). As illustrated in FIG. 9, the execution control table is a table that includes the following information in associated state: one or more device IDs and one or more operation IDs pertaining to the remaining processing in the execution target cooperative process; and the time (date/time) at which execution instructions are to be transmitted to the one or more household electric devices in the device group for the operations in the remaining processing (the second through fourth operations).

Note that in Step S725, the time specified by the parameter included in the execution information is written as-is in the date/time fields of the execution control table.

In Step S725, information pertaining to the execution target cooperative process, e.g., the first cooperative process, is written in the execution control table as an entry with an execution control number "1". More specifically, the following information pertaining to the second operation in the first cooperative process is written in the execution control table: device ID "2"; operation ID "B2"; and time "7:00", which is the time specified by the parameter included in the execution information. Further, the following information pertaining to the third operation in the first cooperative process is written in the execution control table: device ID "3"; operation ID "C2"; and time "7:00", which is the time specified by the parameter included in the execution information.

In Step S726, the control unit 206 transmits an execution instruction instructing execution of a corresponding operation to each of the one or more household electric devices in the device group for the remaining processing in the execution target cooperative process specified in Step S722. Here, an execution instruction is transmitted to each of the household electric devices in the device group for the remaining processing, which are to execute a corresponding one of the one or more operations in the remaining processing. Further, note that the control unit 206 provides execution instructions by transmitting control commands.

For example, when the first cooperative process has been specified as the execution target cooperative process, the control unit 206 transmits to the second household electric device 30-2, which is identified by device ID "2", a control command ("9252xxxx") corresponding to the operation ID (operation ID "B2") of the operation to be executed by the second household electric device 30-2, as an execution instruction. The transmission of control commands is performed by the control unit 206 using the communication unit 201.

Further, in this example, the control unit 206 transmits to the third household electric device 30-3, which is identified by device ID "3", a control command ("8020xxxx") corresponding to the operation ID (operation ID "C2") of the operation to be executed by the third household electric device 30-3, as an execution instruction.

In Step S726, note that in the case when an execution control table has been created in Step S725, the control unit 206 transmits the one or more control commands at the time specified in the date/time field of the execution control table. That is, when an execution control table has been created in Step S725 in the example described above, the control unit 206 refers to the execution control table and transmits the control command ("9252xxxx") to the second household electric device 30-2 and the control command ("8020xxxx") to the third household electric device 30-3 when the present time equals "7:00". Due to this, even when the household electric devices to which the control commands are transmitted do not have timer functions provided thereto, the household electric devices are caused to execute operations at an appropriate time. Thus, a cooperative process is executed.

In Step S731, the household electric devices that are to perform the remaining processing receive the respective execution instructions from the server 10.

In Step S732, in each of the household electric devices that receive execution instructions, the control unit 507 notifies the unique function unit 506 of the execution instruction having been received (i.e., the control command having been received), thereby causing the unique function unit 506 to execute the operation pertaining to the execution instruction.

In Step S732, in the second household electric device 30-2 for example, the control unit 507 notifies the unique function unit 506 of the control command with the value "9252xxxx". The unique function unit 506 executes the high-power mode operation according to this control command. Similarly, in the third household electric device 30-3, the control unit 507 notifies the unique function unit 506 of the control command with the value "8020xxxx". The unique function unit 506 executes the rice cooking start operation according to this control command.

Through the above processing, as one example of a cooperative process, the first household electric device 30-1 provides an alarm notification to the user, the second household electric device 30-2 starts the high-power mode operation (either cooling or heating), and the third household electric device 30-3 starts the rice cooking operation, all at the time specified.

2. Embodiment 2

2.1 Overview

In embodiment 1, the server 10 specifies an execution target cooperative process based on a particular operation executed by the particular household electric device. Alternatively, in the cooperative process execution system pertaining to the present invention, the specification of an execution target cooperative process may be performed by any component included in the cooperative process execution system. In embodiment 2, description is provided on a case where each household electric device in the cooperative process execution system specifies one operation that the household electric device is to execute among the operations composing a cooperative process.

In the following, description is provided on a cooperative process execution system 1a, while referring to examples illustrated in the accompanying drawings. Note that in embodiment 2, components already described in embodiment 1 are provided with the same reference signs and description thereon is not provided unless when necessary.

Figure 10:
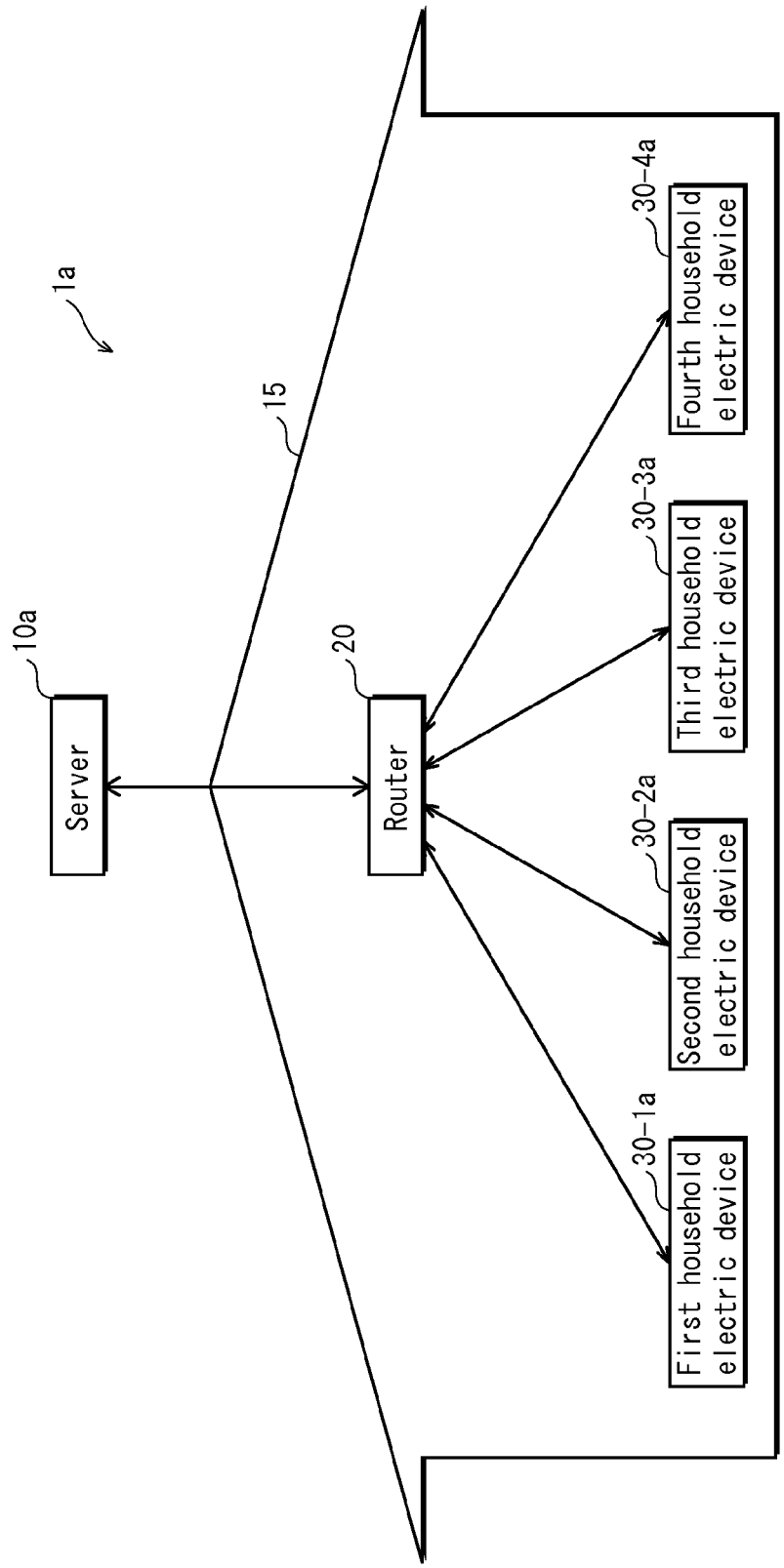
FIG. 10 illustrates a configuration of a cooperative process execution system pertaining to embodiment 2.

As illustrated in FIG. 10, the cooperative process execution system 1a includes: a router 20; a first household electric device 30-1a; a second household electric device 30-2a; a third household electric device 30-3a; a fourth household electric device 30-4a; and a server 10a. The router 20 and the household electric devices 30-1a through 30-4a are located inside the user home 15. The server 10a is not located in the home 15, but is connected to the router 20 via a network. The first household electric device 30-1a is a smartphone. The second household electric device 30-2a, the third household electric device 30-3a, and the fourth household electric device 30-4a are an air conditioner, a rice cooker, and a washing machine, respectively.

2.2 Server 10a

The server 10a controls the household electric devices 30-1a through 30-4a and thereby realizes cooperative processes. In the following, description is provided on the server 10a.

Figure 11:
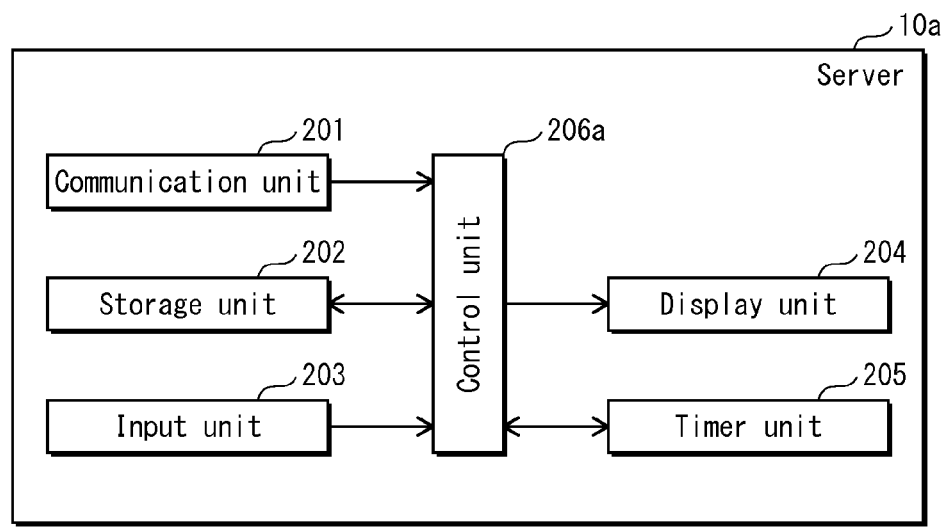
FIG. 11 is a block diagram illustrating a configuration of a server pertaining to embodiment 2.

The server 10a is implemented by using a computer. The server 10a has the function of controlling household electric devices such that the household electric devices operate cooperatively, whereby cooperative processes are realized. As illustrated in FIG. 11, the server 10a includes: the communication unit 201; the storage unit 202; the input unit 203; the display unit 204; the timer unit 205; and a control unit 206a.

(1) Control Unit 206a

The control unit 206a is implemented by using at least a processor and a memory. The control unit 206a has overall control over the operations of the server 10a. The control unit 206a performs the functions provided thereto by the processor executing one or more programs stored in the memory.

The control unit 206a has, as a major function thereof, an information distribution function. The information distribution function is a function of, for each operation (one or more of second, third, and fourth operations) corresponding to a first operation executed by the particular household electric device, transmitting device information and execution information, which are acquired from the particular household electric device, to a corresponding household electric device. The processing in the execution of the information distribution function corresponds to processing in Step S1311 in FIG. 13.

2.3 Electric Devices 30-1a, 30-2a, 30-3a, 30-4a

The first household electric device 30-1a, the second household electric device 30-2a, the third household electric device 30-3a, and the fourth household electric device 30-4a are household electric devices that execute operations included in cooperative processes. Other than a storage unit 502a and a control unit 507a, the household electric devices 30-1a through 30-4a have structures similar to the household electric devices 30-1 through 30-4. Accordingly, in the following, description is provided on the structures of the household electric devices 30-1a through 30-4a while taking the first household electric device 30-1a as an example, and description on the household electric devices 30-2a through 30-4a is not provided unless necessary.

Figure 12:
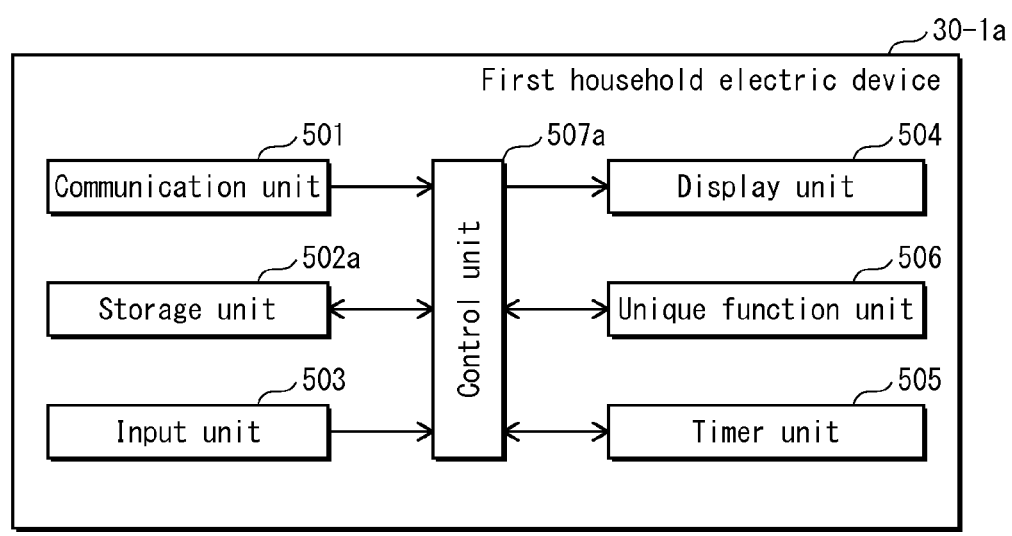
FIG. 12 is a block diagram illustrating a configuration of a first household electric device pertaining to embodiment 2.

As illustrated in FIG. 12, the first household electric device 30-1a includes the following functional units: the communication unit 501; the storage unit 502a; the input unit 503; the display unit 504; the timer unit 505; the unique function unit 506; and the control unit 507a.

(1) Storage Unit 502*a*

The storage unit 502*a* is implemented by using a non-volatile recording medium such as a flash memory or a hard disk drive. The storage unit 502*a* stores data therein. The storage unit 502*a* stores therein the device operation table and the cooperative process composition table. The device operation table and the cooperative process composition table are similar to those in embodiment 1. Here, note that embodiment 2 differs from embodiment 1 in that the cooperative process composition table is stored in the storage unit 502*a* of the first household electric device 30-1*a* in addition to being stored in the storage unit 202 of the server 10*a*, whereas the cooperative process composition table is only stored in the storage unit 202 of the server 10 in embodiment 1.

(2) Control Unit 507*a*

The control unit 507*a* is implemented by using at least a processor and a memory. The control unit 507*a* has overall control over the operations of the first household electronic device 30-1*a*. The control unit 507*a* performs the following functions by the processor executing one or more programs stored in the memory.

Major ones of the functions provided to the control unit 507*a* include: the operation list display function; the information transmission function; a cooperative process specification function; the unique function unit control function; and the registration request function. Among such functions, the operation list display function, the information transmission function, and the registration request function are similar to those described in embodiment 1. On the other hand, it should be noted that the unique function unit control function provided to the control unit 507*a* differs from that provided to the control unit 507 in embodiment 1. In the following, the cooperative process specification function and the unique function unit control function are described one by one.

(A) Cooperative Process Specification Function

The cooperative process specification function is a function of specifying an execution target cooperative process. Processing in the cooperative process specification function corresponds to the processing in Step S1322 in FIG. 13 and the processing in FIG. 14.

(B) Unique Function Unit Control Function

The unique function unit control function includes that based on a user instruction and that based on an execution instruction. The unique function unit control function based on a user instruction is similar to that in embodiment 1. The processing in the execution of the unique function unit control function based on a user instruction corresponds to processing in Steps S712 and S713 in FIG. 13.

The unique function unit control function based on an execution instruction differs from that in embodiment 1 as follows. In embodiment 1, the control unit 507, by executing the unique function unit control function based on an execution instruction, instructs the unique function unit 506 to execute an operation whose execution is instructed by a control command received from the server 10. In contrast, in embodiment 2, the control unit 507*a*, by executing the unique function unit control function based on an execution instruction, instructs the unique function unit 506 to execute an operation included in the execution target cooperative process that the own device (the first household electric device 30-1*a*) is to execute. Note that the execution target cooperative process is specified by the control unit 507*a* executing the cooperative process specification function described above. The processing in the execution of the unique function unit control function based on an execution instruction corresponds to processing in Steps S1323 through S1326 in FIG. 13.

2.4 Operation

Figure 13:
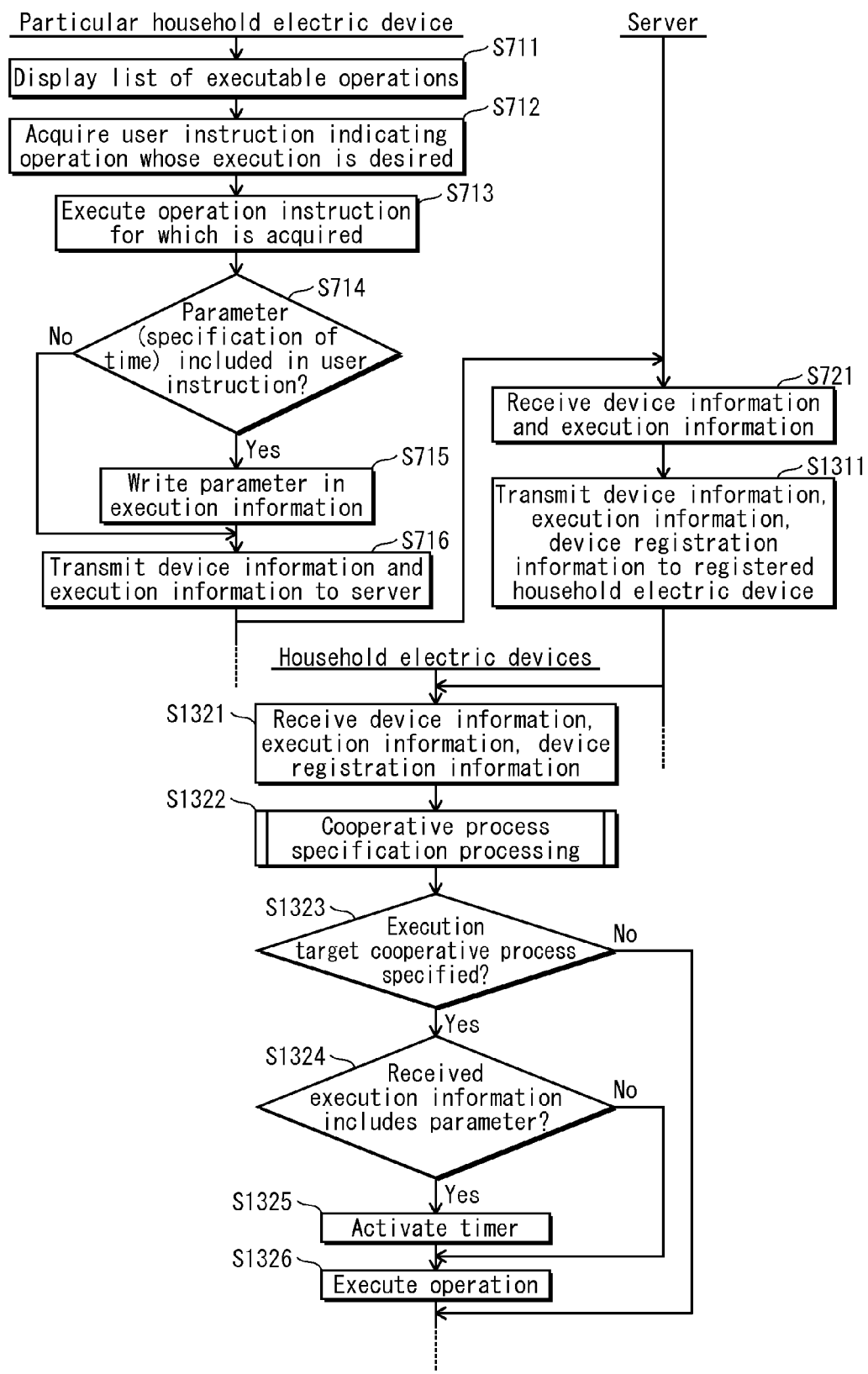
FIG. 13 is a flowchart illustrating a cooperative process pertaining to embodiment 2.

In the following, description is provided on the processing when the cooperative process execution system 1*a* executes a cooperative process, with reference to FIGS. 13 and 14.

The processing in Step S721 and Steps S711 through S716 is similar to that in embodiment 1.

In Step S1311, the control unit 206*a* of the server 10*a* transmits, to each of the household electric devices registered to the server 10*a*, the device information and the execution information that have been acquired in Step S721, and in addition, device registration information.

Figure 15:
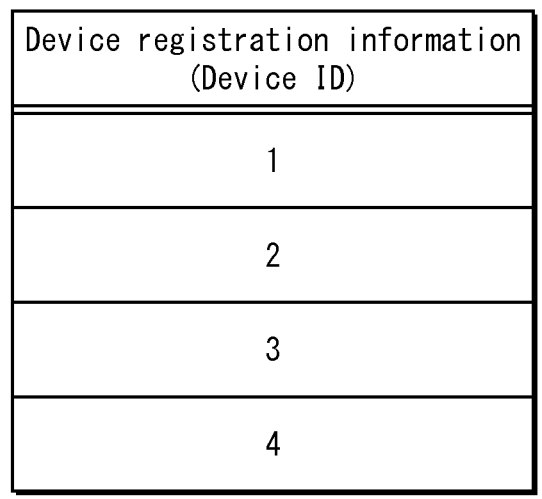
FIG. 15 illustrates device registration information pertaining to embodiment 2.
Figure 17:
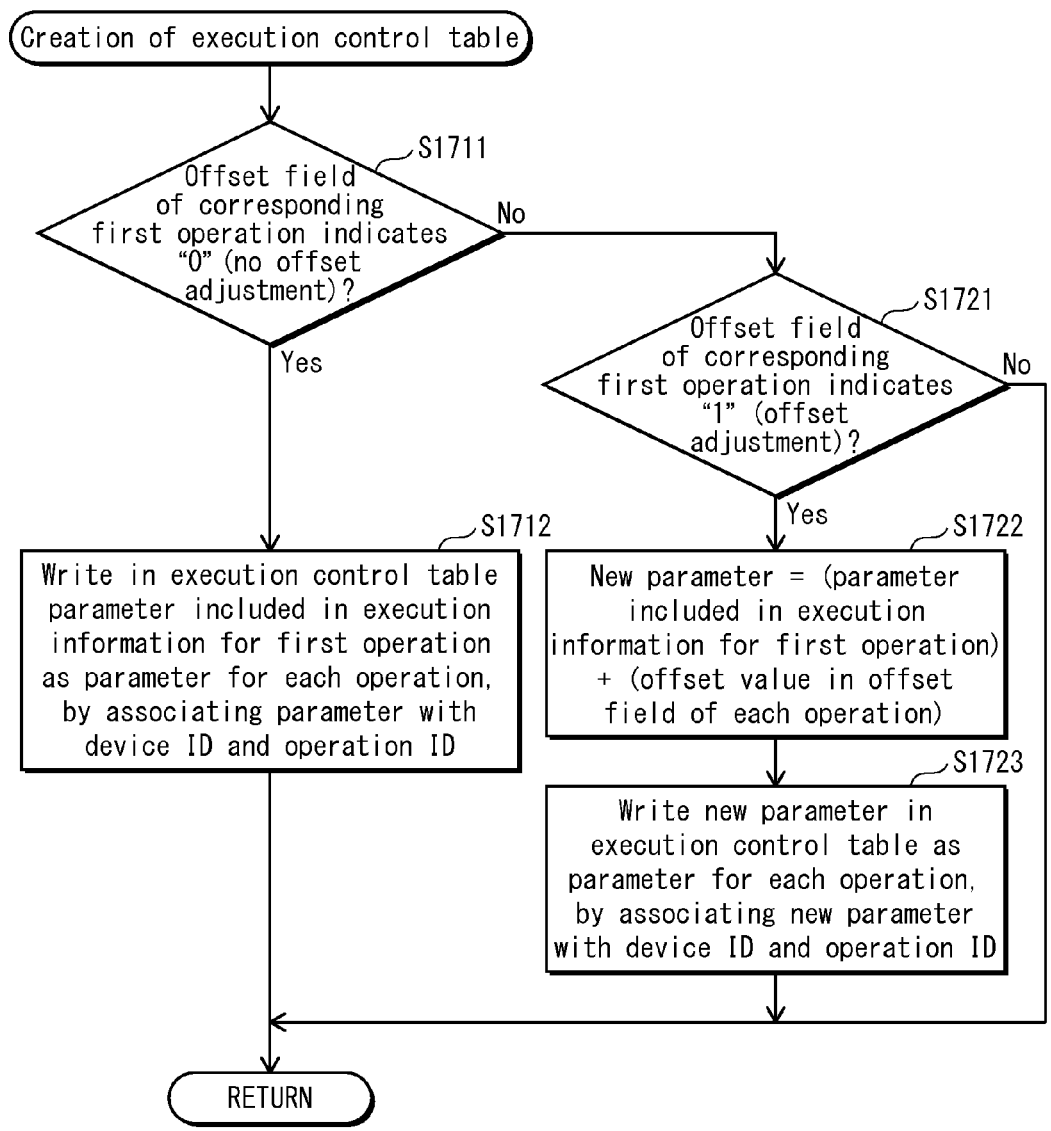
FIG. 17 is a flowchart illustrating a process of creating an execution control table, pertaining to one modification.

As illustrated in FIG. 15, the device registration information is a list of one or more device IDs of household electric devices corresponding to registration state fields with a value "1" ("Registered") in the device information table.

In Step S1321, each of the household electric devices registered to the server 10*a* receives the device information, the execution information, and the device registration information from the server 10*a*.

For example, the device information includes device ID "1", which indicates the first household electric device 30-1*a*. Further, for example, the execution information includes operation ID "A2", which indicates the alarm operation.

In Step S1322, in each of the household electric devices having received such information, the control unit 507*a* executes cooperative process specification processing based on the device information, the execution information, and the device registration information.

In the following, description is provided on details of the cooperative process specification processing in Step S1322, with reference to FIG. 14.

Figure 8:
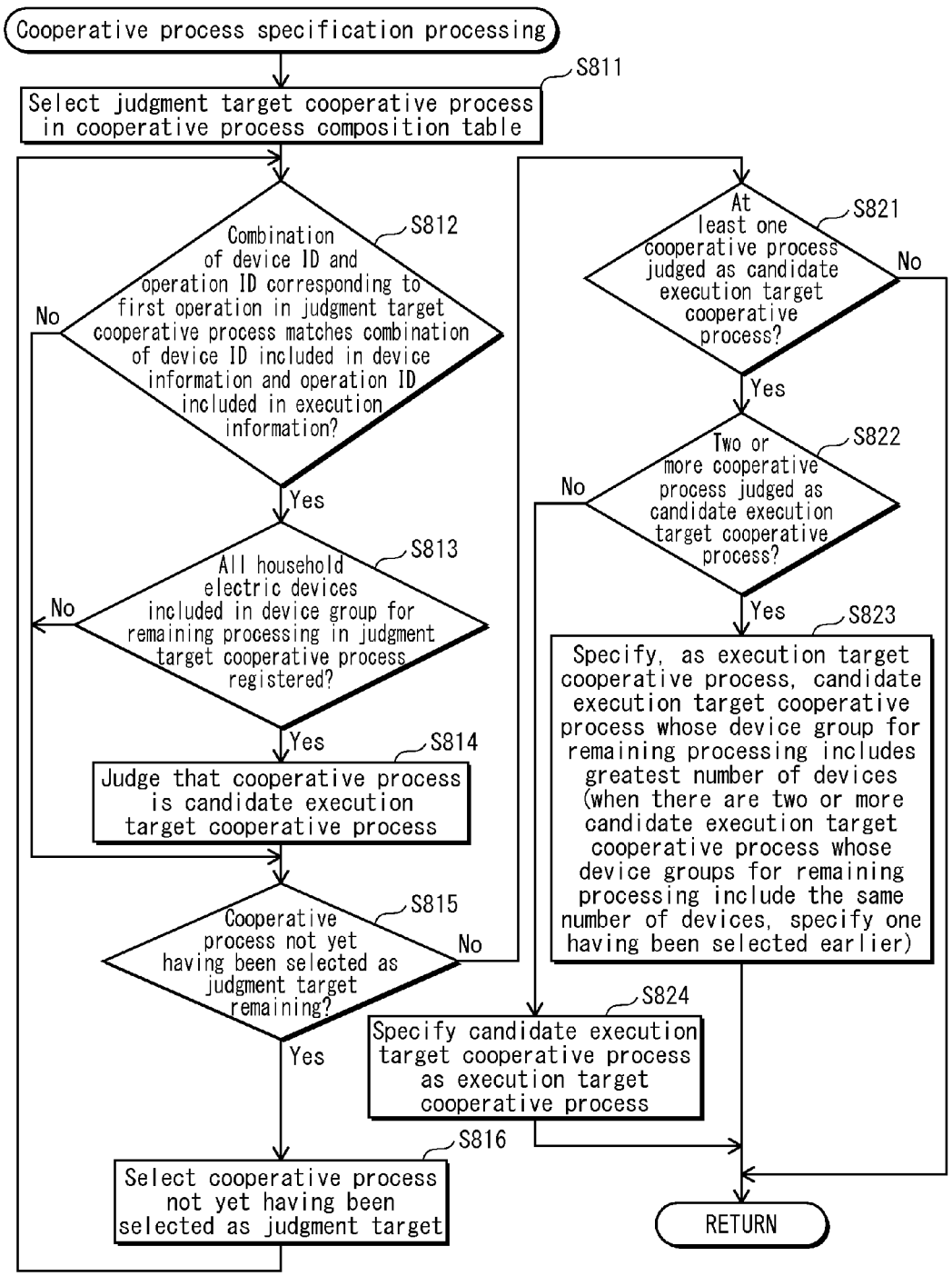
FIG. 8 is a flowchart illustrating cooperative process specification processing pertaining to embodiment 1.
Figure 14:
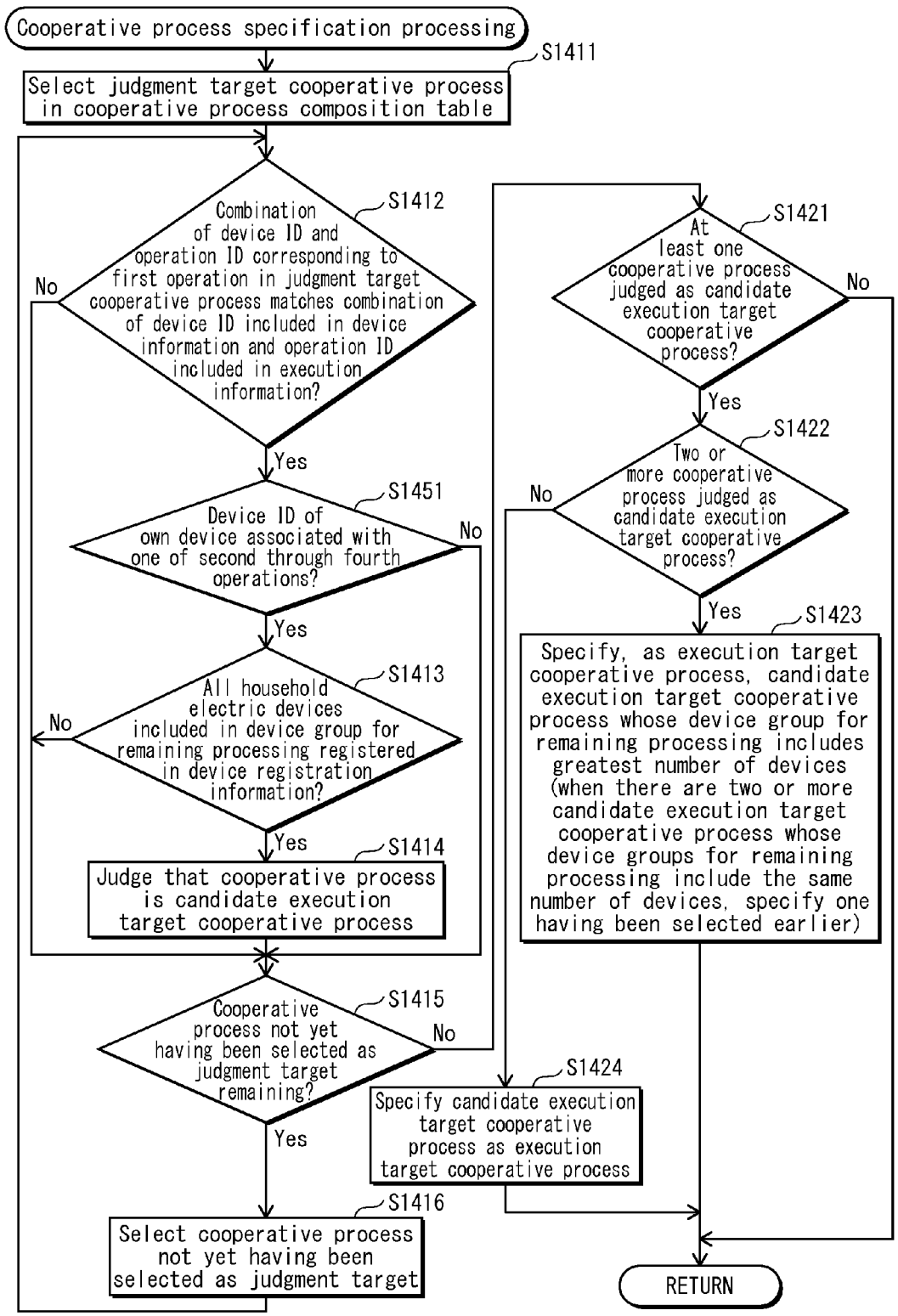
FIG. 14 is a flowchart illustrating cooperative process specification processing pertaining to embodiment 2.

Here, note that the cooperative process specification processing illustrated in FIG. 14 and the cooperative process specification processing description on which is provided with reference to FIG. 8 are similar in terms of the processing included therein, while differing in terms of who executes the processing. In specific, the cooperative process specification processing illustrated in FIG. 14 is executed by household electric devices, whereas the cooperative process specification processing illustrated in FIG. 8 is executed by a server. To provide specific explanation on the similarity between the processing pertaining to FIG. 14 and processing pertaining to FIG. 8, Step S1411, Step S1412, Steps S1414 through S1416, and Steps S1421 through S1424 in FIG. 14 are similar to Step S811, Step S812, Steps S814 through S816, and Steps S821 through S824 in FIG. 8, respectively. Accordingly, description on processing similar in FIG. 14 and FIG. 8 is not provided in the following.

Meanwhile, FIG. 14 differs from FIG. 8 in that Step S1451 is inserted between Steps S1412 and S1413, and in that device registration information is used in the judgment in Step S1413.

When an affirmative judgment is made with respect to a judgment target cooperative process in Step S1412, the control unit 507*a* in each household electric device executing the cooperative process specification processing, in Step S1451, judges whether or not the device ID of the household electric device is associated with one of the operations (second operation, third operation, or fourth operation) of the judgment target cooperative process. When the result of the judgment is affirmative ("Yes" in Step S1451), processing proceeds to Step S1431. On the other hand, when the result of the judgment is negative ("No" in Step S1451), processing proceeds to Step S1415.

Thus, a situation is avoided where through Steps S1413 and S1414, a cooperative process not including an operation to be executed by the household electric device is judged as being a candidate execution target cooperative process.

In Step S1413, the control unit 507a in the electric household device judges whether or not all of the household electric devices included in the device group for the remaining processing in the judgment target cooperative process are registered to the server 10a, by referring to the device registration information instead of the device information table referred to in Step S813.

This concludes the description on the cooperative process specification processing. In the following, description is provided from Step S1323 and on.

In Step S1323, a judgment is made of whether or not the execution target cooperative process has been specified through the cooperative process specification processing in Step S1322. When the execution target cooperative process has not been specified through the cooperative process specification processing ("No" in Step S1323), processing is terminated. On the other hand, when the execution target cooperative process has been specified through the cooperative process specification processing ("Yes" in Step S1323), processing proceeds to Step S1324.

In Step S1324, a judgment is made of whether or not the execution information having been received includes a parameter. When the execution information does not include a parameter ("No" in Step S1324), processing proceeds to Step S1326. On the other hand, when the execution information includes a parameter ("Yes" in Step S1324), processing proceeds to Step S1325.

In Step S1325, the control unit 507a activates a timer.

More specifically, the control unit 507a configures the timer 505 such that when the time specified by the parameter arrives, a notification is provided to that effect.

In Step S1326, the control unit 507a provides an instruction to the unique function unit 506 for execution of one of the operations in the remaining processing (second, third, or fourth operation) that is associated with the device ID of the household electric device. Further, the unique function unit 506 executes the operation whose execution is instructed by the control unit 507a.

Note that in Step S1326, when the timer has been activated in Step S1325, the control unit 507a provides the unique function unit 506 with an instruction for the execution of an operation at the point when the control unit 507a receives a notification from the timer 505 that the present time has equaled the time specified.

3. Modifications

Up to this point, description has been provided on the cooperative process execution system pertaining to the present invention based on embodiments thereof. However, the present invention is not limited to the cooperative process execution systems described in the embodiments, and modifications such as those described in the following are within the spirit and the scope of the present invention.

(1) In embodiment 1, the timing at which the server 10 transmits an execution instruction to each household electric device that is to execute one of the second through fourth operations changes depending upon whether or not the execution information pertaining to the first operation that is received by the server 10 includes a parameter or not. Specifically, when the execution information does not include a parameter, the server 10 transmits control commands to the relevant household electric devices as soon as the control commands to be transmitted are specified ("No" in Step S724 and Step S726). On the other hand, when the execution information includes a parameter, the server 10 transmits control commands to the relevant household electric devices at the time specified by the parameter ("Yes" in Step S724 and Steps S725 and S726).

However, the execution instructions may be transmitted at other timings, provided that a cooperative process is executed when the household electric devices receiving the execution instructions execute operations based on the control commands.

(A) For example, a cooperative process may be executed by the server 10 performing control such that the first through fourth operations are executed sequentially.

Specifically, the server 10, after receiving the execution information pertaining to the first operation, waits to receive a notification that the execution of the first operation has been completed. Note that here, a household electric device executing an operation included in a cooperative process (any one of the first through fourth operations), upon completion of the execution of the operation, provides the server 10 with a notification of completion.

The server 10, when receiving a notification of completion from a household electric device executing the first operation, transmits an execution instruction pertaining to the second operation to a household electric device that is to execute the second operation. Subsequently, the server 10, when receiving a notification of completion pertaining to the second operation, transmits an execution instruction pertaining to the third operation to a household electric device that is to execute the third operation. Then, the server 10, when receiving a notification of completion pertaining to the third operation, transmits an execution instruction pertaining to the fourth operation to a household electric device that is to execute the fourth operation.

(B) When the execution information includes a parameter, the server 10 may transmit control commands not at the time specified by the parameter but at a time calculated by adding an offset value to the time specified by the parameter.

For example, as illustrated in FIG. 16, the cooperative process composition table may be provided with, in addition to devices ID and operations ID associated with the second through fourth operations, offset values associated with the second through fourth operations. Each offset value indicates a difference from the time specified by the parameter in minutes, for example.

Further, the cooperative process composition table illustrated in FIG. 16 also includes offset values associated with the first operation. An offset value "1" associated with the first operation is a flag indicating that offsets are applied to the second through fourth operations linked therewith. On the other hand, offset value "0" associated with the first operation is a flag indicating that offsets are not applied to the second through fourth operations linked therewith.

In the following, description is provided on processing for creating an execution control table pertaining to the present modification. Note that this processing corresponds to Step S725 in embodiment 1.

In Step S1711, a judgment is made of whether or not the offset field corresponding to the first operation in the execution target cooperative process has a value "0". When the offset field corresponding to the first operation has a value "0" ("Yes" in Step S1711), processing proceeds to Step S1712. On the other hand, when the offset field corresponding to the first operation does not have a value "0" ("No" in Step S1711), processing proceeds to Step S1721.

For example, when the third cooperative process is the execution target cooperative process, the offset field corresponding to the first operation has a value "1". Thus, in this example, a negative judgment is made in Step S1711 ("No" in Step S1711).

In Step S1712, the control unit 206 writes the parameter included in the execution information pertaining to the first operation in the execution control table so as to be associated with the device ID and the operation ID corresponding to each of the operations in the remaining processing. Thus, the parameter included in the execution information is written in the execution control table as parameters pertaining to the second through fourth operations.

For example, when the eighth cooperative process is the execution target cooperative process and the parameter pertaining to the first operation indicates "7:00", the following information is written in an associated state in the execution control table as information pertaining to the second operation in the eighth cooperative process: the specified time ("7:00"); a device ID ("2"); and an operation ID ("B1").

In Step S1721, the control unit 206 makes a judgment of whether or not the offset field corresponding to the first operation in the execution target cooperative process has a value "1". When the offset field corresponding to the first operation has a value "1" ("Yes" in Step S1721), processing proceeds to Step S1722. On the other hand, when the offset field corresponding to the first operation does not have a value "1" ("No" in Step S1721), processing is terminated ("RETURN").

For example, when the third cooperative process is the execution target cooperative process, the offset field corresponding to the first operation has a value "1". Thus, in this example, an affirmative judgment is made in Step S1721 ("Yes" in Step S1721).

In Step S1722, the control unit 206 calculates a new parameter for each operation in the remaining processing (a value obtained through the calculation of: parameter included in execution information pertaining to first operation+offset value in offset field of each operation).

For example, when the third cooperative process is the execution target cooperative process and the parameter indicates "7:00", the new parameter for the second operation is calculated as (7:00)+(−5)=6:55. Similarly, the new parameter for the third operation is calculated as (7:00)+(5)=7:05. Finally, the new parameter for the fourth operation is calculated as (7:00)+(10)=7:10.

In Step S1723, each new parameter so calculated is written in the execution control table as the parameter for the corresponding operation in association with the device ID and the operation ID of the corresponding operation, and processing is terminated ("RETURN").

For example, when the third cooperative process is the execution target cooperative process and when writing information pertaining to the second processing in the third cooperative process in the execution control table, the control unit 206 writes the following information in an associated state in the execution control table as information pertaining to the second operation in the third cooperative process: a specified time ("6:55"); a device ID ("2"); and an operation ID ("B3"). In this example, through the processing in Step S1723, the execution control table illustrated in FIG. 9 (in particular, the entry with an execution control number "2") is created.

Through the processing described above, when taking the third cooperative process as an example, when a smartphone executes a first operation of setting an alarm to make a notification at 7:00, the relevant household electric devices operate as follows: (i) an air conditioner executes a second operation of performing high-power mode operation at 6:55, whereby a room is cooled; (ii) the smartphone makes a notification in the form of sound, etc., at 7:00; (iii) a rice cooker executes a third operation of starting rice cooking at 7:05; and (iv) a washing machine executes a fourth operation of starting washing at 7:10.

Note that in the above-described example, the offset value for each of the third and fourth operations is set in advance while taking into consideration the time required for the completion of each of the third and fourth operations. This provides the user with the impression of improved convenience. For example, when the third operation (rice cooking) requires fifteen minutes from commencement to completion, starting rice cooking at 7:05 results in the completion of rice cooking at 7:20. By making such a configuration, the user, when waking up at 7:00 and dressing up in twenty minutes, is able to start eating breakfast at 7:20.

Similarly, when the fourth operation (washing) requires thirty minutes from commencement to completion, starting washing at 7:10 results in the completion of washing at 7:40. Thus, the user, after eating breakfast in twenty minutes, is able to start drying the washing at 7:40.

When the third cooperative process is executed as described above, the user is able to wake up in a room whose temperature is adjusted appropriately and is able to eat breakfast and dry the washing smoothly, without wasting time.

As such, to improve convenience for the user, the offset values to be written in the cooperative process composition table illustrated in FIG. 16 are to be determined in advance separately for each household electric device and for each operation to be executed, taking into account the time required for each operation. Note that the offset values provided in FIG. 16 are mere examples of such values, and may be changed as appropriate based on the actual specification of the household electric devices, etc.

In addition, in the embodiments and modifications described above, description is provided on examples where a parameter for specification of time is used. Alternatively, other parameters that are necessary for the execution of operations may also be used. Such parameters include, for example, a parameter specifying temperature, which may be used with air conditioners, water heaters, etc.

(C) The server 10, instead of transmitting control commands to household electric devices after waiting for the present time to equal the time specified by the parameter, may immediately transmit, to household electric devices, control commands including a specification of time as a parameter. In such a case, each of the household electric device receiving such control commands stores therein the specified time and executes the operation indicated by the control command when the present time equals the specified time.

Further, note that in this case, the parameter included in a control command to be transmitted may be a parameter that has been corrected by applying an offset, one example of which being the new parameter as described in (B) above.

(2) In the embodiments described above, the execution of a cooperative process by the control unit 206 of the server 10 is triggered by a particular operation being actually executed by the particular household electric device. Alternatively, a cooperative process may be triggered based on a record of operations that were executed in the past (referred to as an operation record in the following).

For example, the control unit 206 may decide to commence a cooperative process when the operation record indicates that a specific household electric device has been repeatedly executing a specific operation around a specific time for a particular number of days. Description is provided in the following while referring to FIGS. 18 and 19.

Figure 19:
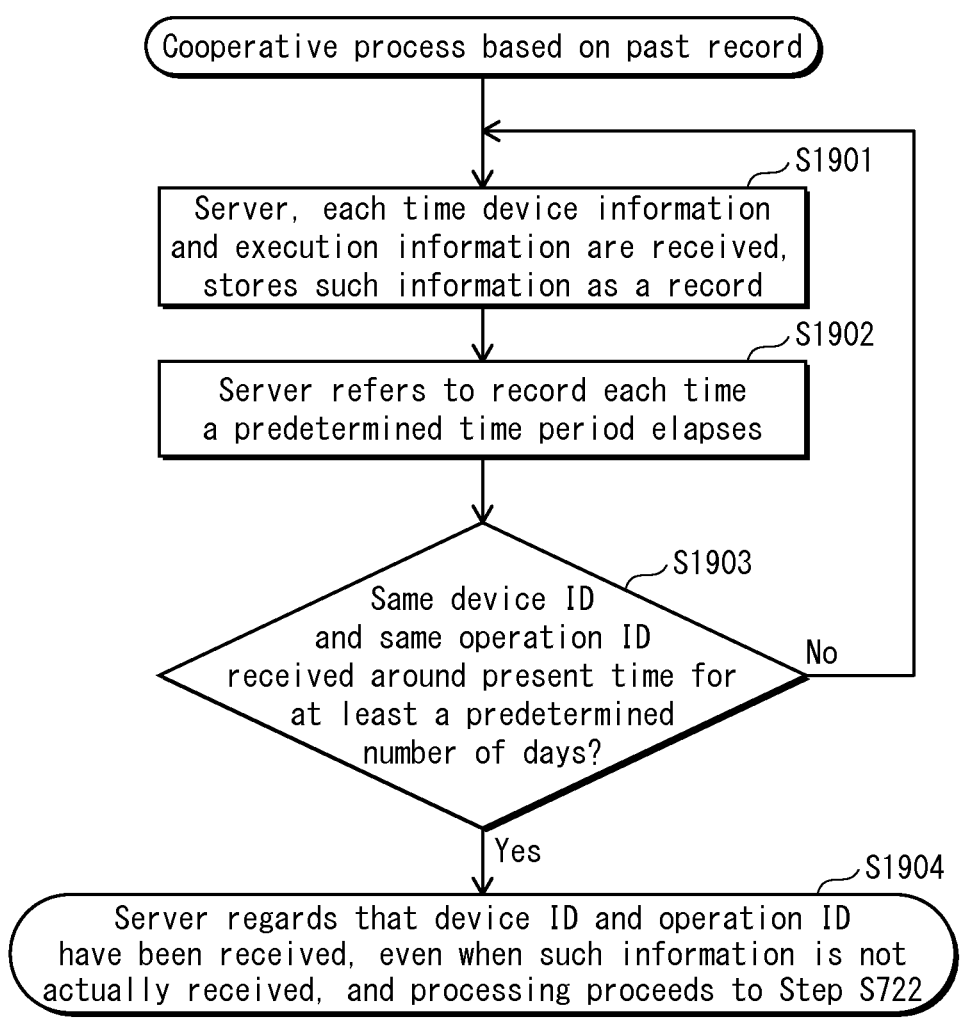
FIG. 19 is a flowchart illustrating a cooperative process based on operation record, pertaining to one modification.

In Step S1901 in FIG. 19, each time the control unit 206 of the server 10 receives, as an operation record, device information and execution information from a specific household electric device among the household electric devices 30-1 through 30-4, the control unit 206 causes the storage unit 202 to store therein operation record information. The operation record information, which is illustrated in FIG. 18, includes information on the date/time at which the device information and the execution information were received from the specific household electric device, the device ID included in the received device information, and the operation ID included in the received execution information.

In Step S102, the control unit 206 refers to the operation record information each time a predetermined period of time elapses (e.g., once every four minutes).

In Step S1903, the control unit 206 judges whether or not the operation record information indicates that a combination of one device ID and one operation ID has been repeatedly received around the present time indicated by the timer unit 205 for at least a predetermined number of days. Here, note that expression "around the present time" indicates, for example, a time range from two minutes before to two minutes after the present time. Further, the predetermined number of days equals, for example, five days. When the result of the judgment is affirmative ("Yes" in Step S1903), processing proceeds to Step S1904. On the other hand, when the result of the judgment is negative ("No" in Step S1903), processing proceeds to Step S1901.

In the following, detailed description is provided on the judgment in Step S1903. For example, say the present time is 12:00, Jun. 6, 2013. The operation record information illustrated in FIG. 18 indicates that a combination of device ID "1" and operation ID "A2" was received at 12:00, each day between Jun. 1, 2013 and Jun. 5, 2013. As such, in this example, since the operation record information indicates that a combination of one device ID and one operation ID has been repeatedly received around the present time for 5 days, the control unit 206 judges affirmatively in Step S1903.

In Step S1904, the control unit 206 regards that the same device ID and the same operation ID as that with respect to which an affirmative judgment has been made in Step S1903 have been received, and processing proceeds to Step S722 in FIG. 7, even when such information is not actually received. Processing in and following Step S722 in FIG. 7 has already been described above.

In Step S1904, when the household electric device identified by the same device ID has executed the operation identified by the same operation ID at around 12:00, Jun. 6, 2013, the household electric device would have to execute the operation and the cooperative process including the operation simultaneously if execution of a cooperative process based on an operation record were permitted. Thus, a configuration is made such that in the case described above, execution of a cooperative process based on an operation record is not possible.

When making the modification described above, in a case for example where a user has been executing a specific operation by using a specific household electric device at a specific time of the day for a predetermined number of days until the day before the present day but the user has forgotten to execute the specific operation at the specific time on the present day although intending to do so, the specific operation is executed at the specific time. As such, convenience for the user is increased.

Further, as another example of a cooperative process based on an operation record, a cooperative process may be executed when operation record information indicates that the same combination of a specific device ID and a specific operation ID has been repeatedly received for a predetermined number of times within a specific period.

Further, as another example of a cooperative process based on an operation record, a cooperative process may be executed when a household electric device identified by a specific device ID enters a specific state (for example, a power ON state) by execution of a specific operation and the specific household electric device remains in the specific state for a predetermined period of time. In this example, the judgment of whether or not the specific state of the specific household electric device has been continuing for the predetermined period of time can be performed according to whether or not the operation record information indicates that an operation for putting the specific household electric device into another state (for example, a power OFF state) has been executed within the predetermined period of time from when the specific operation for putting the specific household electric device into the specific state (for example, the power OFF state) was performed.

(3) In the embodiments described above, description is provided that a cooperative process is composed of a plurality of operations each executed by a different one of a plurality of household electric devices. However, provided that a cooperative process is composed of a plurality of operations, each of the operations composing the cooperative process need not be executed by a different household electric device. For example, a cooperative process may be composed of a plurality of cooperative processes, or may be composed of a combination of a plurality of cooperative processes and one or more operations each executed by a different household electric device.

In the following, description is provided while referring to a cooperative process composed of a plurality of cooperative processes as a "multiple cooperative process". Further, each cooperative process composing a multiple cooperative process is referred to as a "unit cooperative process".

Figure 20:
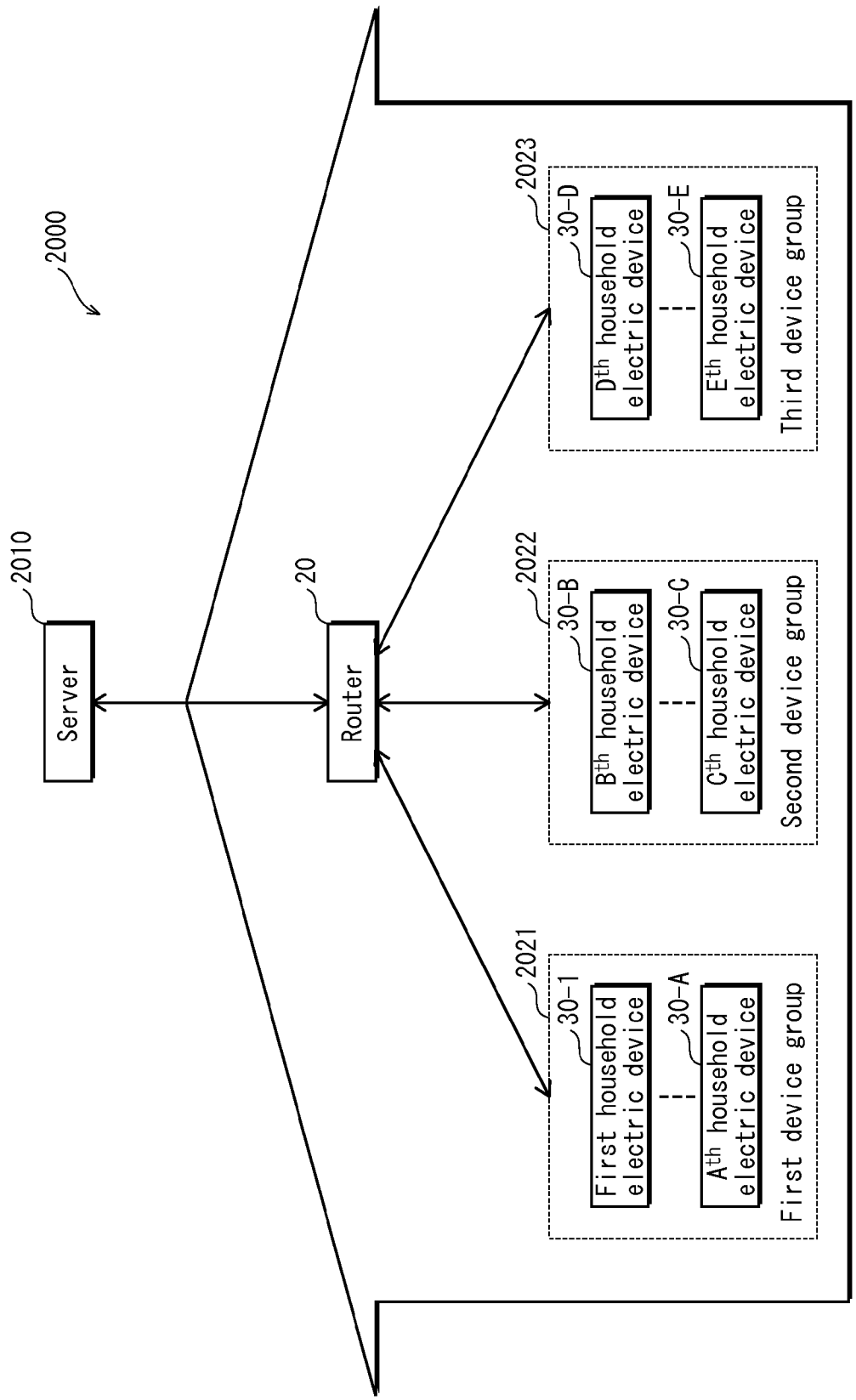
FIG. 20 illustrates a configuration of a cooperative process execution system pertaining to one modification.

As illustrated in FIG. 20, a cooperative process execution system 2000 pertaining to this modification includes: a server 2010; the router 20; a first device group 2021; a second device group 2022; and a third device group 2023. Note that the present modification, which pertains to multiple cooperative processes, substantially corresponds to the above embodiments when, in the embodiments, cooperative processes are replaced with multiple cooperative processes and operations composing a cooperative process are replaced with unit cooperative processes.

Unless where otherwise stated, the server 2010 has a structure similar to that of the server 10. Thus, description on the structure of the server 2010 is provided with reference to FIG. 2 in the following. Further, in the following, unless otherwise stated, household electric devices other than the first household electric device 30-1 have the same structure as the first household electric device 30-1. Thus, description on the structure of household electric devices is provided with reference to FIG. 5 in the following.

The first device group 2021 is composed of a plurality of household electric devices, namely household electric devices 30-1 through 30-A. The household electric devices that compose the first device group 2021 execute one unit cooperative process.

The second device group 2022 is composed of a plurality of household electric devices, namely household electric devices 30-B through 30-C. The household electric devices that compose the second device group 2022 execute one unit cooperative process.

The third device group 2023 is composed of a plurality of household electric devices, namely household electric devices 30-D through 30-E. The household electric devices that compose the second device group 2023 execute one unit cooperative process.

When one of the plurality of device groups executes a unit cooperative process, one of the household electric devices in the device group executing the unit cooperative process transmits, to the server 2010, a group ID identifying the device group and an operation ID indicating the unit cooperative process having been executed. Here, note that the household electric device that transmits the group ID and the operation ID to the server 2010 may be a predetermined household electric device or may be a household electric device having executed a predetermined operation among the operations included in the unit cooperative process.

The server 2010 specified an execution target multiple cooperative process by referring to a multiple cooperative process composition table.

As illustrated in FIG. 21, the multiple cooperative process composition table associates a first unit cooperative process in a multiple cooperative process with other unit cooperative processes (second and third unit cooperative processes) included in the multiple cooperative process. Further, in the multiple cooperative process composition table, each unit cooperative process (first, second, and third unit cooperative processes) in a multiple cooperative process is specified by a combination of a group ID of a device group executing the unit cooperative process and an operation ID identifying the unit cooperative process. Note that when a multiple cooperative process is composed of only two unit cooperative processes, i.e., when a third unit cooperative process is not executed, the group ID field and the operation ID field for the third unit cooperative process are blank in the multiple cooperative process composition table.

When the communication unit 201 of the server 2010 receives a group ID and an operation ID transmitted from one device group, the control unit 206 reads out the multiple cooperative process composition table from the storage unit 202.

Then, the control unit 206 judges whether or not one combination of a group ID and an operation ID corresponding to a first unit cooperative process, among multiple such combinations corresponding to first unit cooperative processes in the multiple cooperative process composition table, matches the combination of the group ID and the operation ID received. When a match is found, the control unit 206 specifies the multiple cooperative process including the first unit cooperative process corresponding to the combination of the group ID and the operation ID as the execution target multiple cooperative process.

Subsequently, the server 2010 transmits an execution instruction instructing execution of a corresponding unit cooperative process, which is identified by an operation ID, to each of the device groups, which are identified by group IDs, that are to execute a corresponding one of the second and third unit cooperative processes included in the specified multiple cooperative process.

Following this, each of the device groups receiving the execution instruction executes a unit cooperative process identified by the operation ID included in the execution instruction transmitted from the server 2010. Note that instead of transmitting an execution instruction to each device group as described above, the server 2010 may transmit, to each of the household electric devices in each device group that is to execute a unit cooperative process, an execution instruction instructing execution of an operation included in the unit cooperative process that the household electric device is to execute.

Thus, each of a plurality of device groups composing the cooperative process execution system 2000 executes a unit cooperative process included in a multiple cooperative process. In consequence, the cooperative process execution system 2000 executes a multiple cooperative process.

(4) In the embodiments above, the server 10 and the server 10a each commence cooperative processes when receiving device information and execution information from the particular household electric device, without performing any authentication with respect to the particular household electric device. However, it is preferable that such authentication be performed. Performing authentication avoids cooperative processes being commenced in response to device information and execution information received from a household electric device that is operated by a user whose operation of the household electric device is undesirable, such as a small child or an invalid user. In the authentication, a known authentication process can be employed, such as that using a password.

Further, the security of the communication between the server and household electric devices may be strengthened by making a modification such that a transmitter of data such as device information, execution information, and execution instructions appends to such data verification data, such as a digital signature and a secure hash and the receiver of the data detects falsification of the data by using the verification data.

(5) In the embodiments above, household electric devices 30-1 through 30-4 and the like are located inside the home 15. However, the household electric devices may be located at other locations, provided that the household electric devices are capable of communicating with the server 10, the server 10a, and the like.

Figure 22:
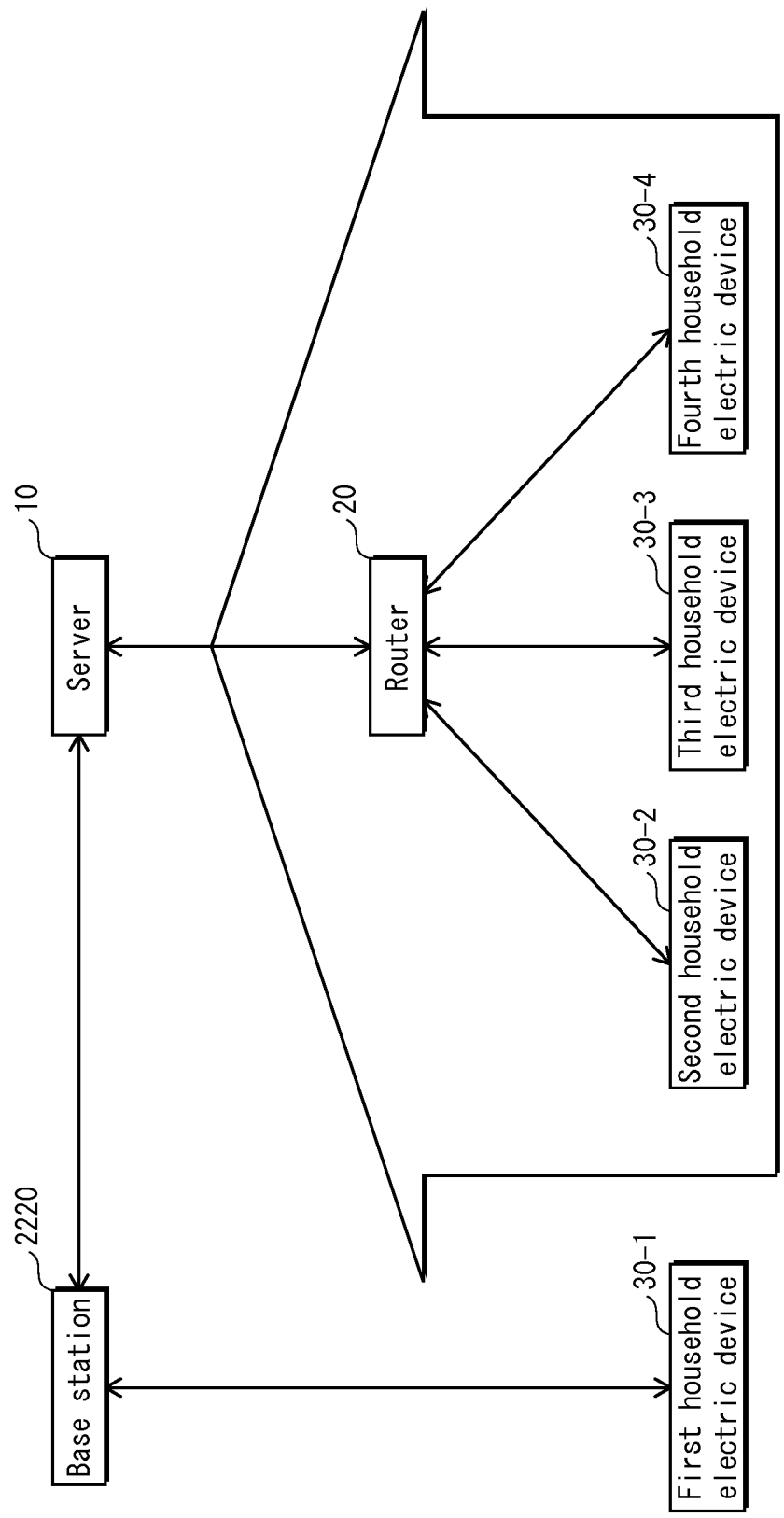
FIG. 22 illustrates a configuration of a cooperative process execution system pertaining to one modification.

For example, the first household electric device 30-1, which is a smartphone, may be carried outside the home 15 by the user, and may communicate with the server 10 via a base station 2220, as illustrated in FIG. 22.

Further, in the embodiments above, the particular household electric device performs the first operation, one example of which is the alarm operation. Alternatively, the first operation may be transmission of a command from the particular household electric device to another household electric device. For example, the particular household electric device may be a smartphone, and the first operation may be transmission to another household electric device, which is for example a rice cooker, of a command for instructing execution of a rice cooking operation. In such a case, the user is able to control a rice cooker in the home 15 from outside the home 15 by using the smartphone.

(6) In the embodiments and modifications above, no specific explanation is provided that household electric devices, in execution of the operation list display function and the unique function unit control function based on a user instruction, display a graphical user interface (referred to as a "GUI" in the following) for urging the user to input user instructions. Alternatively, household electric devices may display GUIs and thereby help the user in the input of user instructions. This provides the user with a sense of improved convenience.

For example, the particular household electric device displays, on the display unit 504, a GUI 2301 illustrated in FIG. 23 for password authentication. The user, viewing the GUI 2301 that is being displayed, inputs a predetermined user account and password by using the input unit 503. The particular household electric device transmits the user account and the password having been input to the server. The server judges whether or not the combination of the user account and password is correct. When the combination is correct, the server notifies the particular household electric device of the success of authentication. The particular household electric device, having received the notification of success of authentication, displays a GUI 2302 on the display unit 504. The GUI 2302 is a list of operations that the particular household electric device is capable of executing when receiving execution instructions from the user.

The user provides a user instruction to the particular household electric device by using the input unit 503 and selecting one of the operations in the list of operations of the GUI 2302.

Note that each of the operations listed in the GUI 2302 may be composed of multiple sub-operations. Accordingly, a modification may be made such that when the user selects an operation composed of multiple sub-operations in the GUI 2302, a GUI (for example a GUI 2303) for allowing the user to select one of the multiple sub-operations is displayed.

For example, "Power ON/OFF" in the GUI 2302 includes two operations, namely a power ON operation and a power OFF operation. In this case, when the user selects "Power ON/OFF" in the GUI 2302, the particular household electric device displays a GUI 2303 for allowing the user to select one of the power ON operation and the power OFF operation.

Meanwhile, FIG. 24 illustrates a GUI that is displayed on the particular household electric device in the case of modification (5) above, where the particular household electric device is a smartphone that controls a rice cooker in the home 15 from outside the home 15.

Note that the description on the GUI 2301, provided with reference to FIG. 23, similarly applies to a GUI 2401 illustrated in FIG. 24.

The smartphone, when receiving a notification of success of authentication from the server after displaying the GUI 2401, displays a GUI 2402. The GUI 2402 is a GUI for allowing the user to select a control target from among the household electric devices in the home 15, and is a list of the names of the household electric devices that may be selected as the control target.

Here, household electric devices that are registered to the server are selectable as the control target. In order to acknowledge which household electric devices are selectable as the control target, the particular household electric device acquires the device information table from the server. Here, the particular household electric device need not acquire the entirety of the device information table, provided that the particular household electric device at least acquires a part of the device information table related to household electric devices with the value "1" in the corresponding registration state fields.

Viewing the GUI 2402, the user inputs, by using the input unit 503 of the particular household electric device, a user instruction specifying one of the household electric devices displayed in the list that the user would like to select as the control target. Here, for example, say the user selects an air conditioner as the control target household electric device.

The particular household electric device, when receiving the user instruction, displays a list of the operations that the household electric device specified by the user instruction is capable of executing, as illustrated by a GUI 2403 in FIG. 24. In this example, "Power ON/OFF", "Temperature setting", "ON timer", and so on are displayed in the GUI 2403 as the operations that the air conditioner is capable of executing. The processing when switching from displaying the GUI 2403 to displaying a GUI 2404 in FIG. 24 is similar to the processing when switching from displaying the GUI 2302 to displaying the GUI 2303 in FIG. 23, and thus description on such processing is not provided.

(7) In the embodiments above, the household electric devices 30-1 through 30-4 are a smartphone, an air conditioner, a rice cooker, and a washing machine, respectively. Alternatively, each household electric device may be any household electric device that is capable of communicating with the server and that can be controlled to execute operations with control commands. The cooperative process execution system may include at least one or none of a smartphone, an air conditioner, a rice cooker, and a washing machine, and may be composed of two, three, or more than five household electric devices. Examples of household electric devices other than a smartphone, an air conditioner, a rice cooker, and a washing machine that may be included in the cooperative process execution system include, for example: devices recording and/or playing back video and/or audio; a digital television broadcast receiver; a microwave oven; a vacuum cleaner; an air purifier; a printer; an electric pot; a coffee maker; a telephone; a portable telephone; an alarm clock; a fax machine; and lighting equipment. Note that the configuration of a unique function unit 506 included in one of the household electric devices above differs from that of a unique function unit 506 included in a different one of the household electric devices above. As described above, the unique function unit 506 in a given household electric device realizes a function unique to the household electric device.

(8) In the second embodiment, the control unit 206a of the server 10a has the information distribution function involving selecting a transmission destination of device information and execution information acquired from the particular household electric device. However, such selection need not be performed, provided that the server 10a, through the information distribution function, at least transmits the device information and the execution information to the household electric devices that are to execute the second through fourth operations in the cooperative process.

For example, the server 10a may, through the information distribution function, transmit the device information and the execution information to all household electric devices included in the cooperative process execution system. When making such a modification, each household electric device receiving the device information and the execution information judges whether or not the operations composing the cooperative process includes an operation that the household electric device is to execute. When a household electric device judges that none of the operations included in the cooperative processes is to be executed by the household electric device, the household electric device may discard the device information and the execution information having been received.

(9) In the embodiments above, household electric devices do not exchange (transmit and receive) data, execution instructions, etc., with one another. Alternatively, household electric devices may exchange data, execution instructions, etc., with one another.

Here, note that various types of household electric devices are included in the cooperative process execution system, examples of which are provided in modification (6) above. Thus, various communication formats are to be employed when making a modification such that the household electric devices communicate with one another. In addition, various control command sets are to be employed by the household electric devices. Due to this, even when instructing household electric devices to execute the same operation (e.g., power ON operation), different control commands may be transmitted to different household electric devices for the execution of the same operation. For example, the control commands may be infrared remote control codes defined by the AEHA format.

When attempting to enable a household electric device to understand and use all communication formats and control command sets used by all other household electric device, the size of the program necessary for controlling the household electric device would reach an enormous size. Further, in the case described above, the household electric device would have to store therein programs for realizing communication with household electric devices that are not included in the cooperative process execution system at present but may be included in the cooperative process execution system in the future. This results in wasteful usage of the storage area of the household electric device.

Thus, in such a case as described above, the server may transmit to the household electric devices included in the cooperative process execution system programs for enabling the household electric devices to communicate with one another and control command sets for enabling the household electric devices to cause other household electric devices included in the cooperative process execution system to execute operations.

This enables the household electric devices included in the cooperative process execution system to transmit data, execution instructions, etc., to other household electric devices included in the cooperative process execution system while realizing a reduction in storage area used for storing data, execution instructions, etc.

(10) In the embodiments above, no specific description is provided on household electric devices exchanging (transmitting and receiving) information with one another. However, the household electric devices may exchange information such as information necessary for the execution of cooperative processes with one another via the server.

(11) In the embodiments above, when the user inputs a user instruction instructing execution of an operation with respect to the particular household electric device, the user selects one operation from among one or more operations displayed in the operation list image. However, such a structure is not always necessary, provided that the user in able to input a user instruction. For example, the input unit 503 of the particular household electric device may have a plurality of keys each for instructing execution of a corresponding operation, and the user may input a user instruction by depressing one of such keys.

(12) In the embodiments above, the server is implemented by using one computer. However, the server need not be one computer, provided that the server is capable of realizing the functions of the server described in the embodiments. For example, the server may be a cloud computing system including at least one computer and a storage unit.

(13) In the embodiments above, when two or more candidate execution target cooperative processes have device groups for remaining processing composed of only household electric devices registered to the server in Step S823, the candidate execution target cooperative process whose device group for remaining processing includes the greatest number of household electric devices is specified as the execution target cooperative process. However, the execution target cooperative process may be specified in a different manner, provided that an execution target cooperative process is specified. For example, cooperative processes may be each be provided with a degree of priority, and in Step S823, one candidate execution target cooperative process having a higher degree of priority than other candidate execution target cooperative processes may be selected as the execution target cooperative process.

(14) In the embodiments above, the server transmits, to a household electric device, device information, execution information, and control command as an execution instruction for instructing execution of an operation pertaining to a cooperative process. However, the execution instruction need not be such, provided that the household electric device is able to execute the operation included in the cooperative process according to such information. For example, the execution instruction may be an operation ID identifying an operation included in a cooperative process.

Further, as control commands, remote control signals defined for different household electric devices may be used. In such a case, the remote control signals may be those in accordance with a conventional format, such as the AEFA format. When making such a modification, household electric devices may make use of conventional analysis routines pertaining to remote control signals in the interpretation of control commands received from the server.

Further, the cooperative process composition table described in the embodiments above associates one control command with each of the first through fourth operations. However, control commands are not limited to such, provided that control commands serve as instructions for execution of the first through fourth operations. For example, a plurality of control commands may be associated with each of the first through fourth operations. More specifically, when the first operation is an operation of executing a specific operation at a specific time, the control command corresponding to the first operation may be composed of a control command specifying the specific time and a control command instructing execution of the specified command, or may be composed to three or more control commands.

(15) In the embodiments above, as in Steps S822 and S823 in FIG. 8, when there are two or more candidate execution target cooperative processes, one of the two or more candidate execution target cooperative processes are selected and executed as the execution target cooperative process. However, the number of candidate execution target cooperative processes selected and executed need not be one, and two or more cooperative processes may be executed.

(16) In the embodiments above, the router 20 only has the function of relaying the communication between the server 10 and the household electric devices. However, the functions of the server 10 and the router 20 need not be clearly distinguished from one another, and at least a part of the functions of the server 10 may be provided to the router 20.

(17) A modification may be made of storing on recording media or distributing via various communication channels control programs composed of program codes written in machine language or high-level language that cause the processors of the server and household electric devices and various circuits connected to such processors to execute processing pertaining to the cooperative process specification function, the cooperative control function, the device registration function, the operation list display function, the information transmission function, and the unique function unit control function, which are described in the embodiments above. Examples of such recording media include an IC card, a hard disk, an optical disc, a flexible disk, ROM, a flash memory, etc. When making such a modification, the distributed control programs are stored in a memory or the like that is readable by a processor, and the functions described in the embodiments above are realized by the processor executing the control programs. The processor, instead of executing the control programs per se, may execute compiled programs or use an interpreter.

(18) The functional units described in the embodiments above (e.g., the communication unit 201, the storage unit 202, the input unit 203, the display unit 204, the timer unit 205, the control unit 206, the communication unit 501, the storage unit 502, the input unit 503, the display unit 504, the timer 505, the unique function unit 506, and the control unit 507) may each be implemented by using a circuit that executes the corresponding function, or may be implemented by one or more processors executing one or more programs.

Note that the above-described functional units are typically implemented by using one or more LSIs, which is one type of integrated circuit. The implementation of the above-described functional units by using LSIs may be performed such that a single LSI chip is used for each individual functional unit. Alternatively, the above-described functional units may be implemented by using LSIs each including one or more of such functional units, or by using LSIs each including a part of each of the functional units. Although referred to here as an LSI, depending on the degree of integration, the terms IC, system LSI, super LSI, or ultra LSI are also used. In addition, the method for assembling integrated circuits is not limited to the above-described method utilizing LSIs, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(19) Parts of the above embodiments and modifications may be combined with one another.

4. Supplement

In the following, explanation is provided on a cooperative process execution system and a cooperative process execution method, each of which pertaining to one aspect of the present disclosure, as well as modifications and effects thereof.

(1) One aspect of the present disclosure is a cooperative process execution method for causing household electric devices that are registered to a server to execute cooperative processes. In the cooperative process execution method pertaining to one aspect of the present disclosure, the server stores correspondence information associating a particular operation to be executed by a particular household electric device with one or more groups each composed of one or more household electric devices, and indicating, for each of the one or more household electric devices in each of the groups, a control signal to be transmitted to the household electric device. The cooperative process execution method pertaining to one aspect of the present disclosure includes: detecting whether or not the particular operation is executed; selecting one of the groups that is composed of one or more household electric devices that are registered to the server by referring to the correspondence information, the selecting executed when the detecting detects the execution of the particular operation; and transmitting the control signal to each of the one or more household electric devices in the selected group.

Due to this, the cooperative process execution method pertaining to one aspect of the present disclosure determines operations to be executed by household electric devices in accordance with combinations of household electric devices that are registered to the server. Thus, the cooperative process execution method pertaining to one aspect of the present disclosure achieves execution of a cooperative process that is suitable for a combination of household electric devices possessed by a user, which differs between different users.

(2) In the cooperative process execution method pertaining to one aspect of the present disclosure, the control signal transmitted in the transmitting may be a predefined command for controlling the household electric device that receives the control signal.

When making such a modification, the server performs management of all control commands that household electric devices are able to interpret. Due to this, a cooperative process is executed by a plurality of household electric devices while each household electric device does not need to have stored therein in advance control commands for other household electric devices that may execute a cooperative process in collaboration therewith.

(3) In the cooperative process execution method pertaining to one aspect of the present disclosure, the control signal transmitted in the transmitting may indicate the execution of the particular operation, each household electric device that is to execute an operation upon the execution of the particular operation may store therein operation information indicating the operation, and the cooperative process execution method pertaining to one aspect of the present disclosure may further include: executing the operation indicated by the operation information, the executing performed by each household electric device having received the control signal and storing the operation information therein.

When making such a modification, the notification that the particular operation has been performed by the particular household electric device is provided to each household electric device in the form of a control command that the household electric device is capable of interpreting, and thus, each household electric device specifies and executes the operation that the household electric device is responsible of executing among operations composing a cooperative process.

(4) In the cooperative process execution method pertaining to one aspect of the present disclosure, the one of the groups selected in the selecting may be a group composed of all household electric devices that are registered to the server, and in the executing, each household electric device having received the control signal but not storing the operation information therein may discard the control signal.

When making this modification, even if the server does not specify an operation to be executed by each household electric device, a cooperative process is executed by each household electric device specifying and executing the operation that the household electric device is responsible of executing.

(5) In the cooperative process execution method pertaining to one aspect of the present disclosure, the server may store additional correspondence information associating another particular operation to be executed by a household electric device, differing from the particular operation, with one or more groups each composed of one or more household electric devices, and indicating, for each of the one or more household electric devices in each of the groups, a control signal to be transmitted to the household electric device, in the detecting, a detection may be performed of whether or not the another particular operation is executed, and in the selecting, when the detecting detects the execution of said another particular operation, one of the groups composed of one or more household electric devices that are registered to the server may be selected with reference to the additional correspondence information.

When making such a modification, a suitable cooperative process is selected from among a plurality of cooperative processes in accordance with the particular operation executed by the particular household electric device.

(6) In the cooperative process execution method pertaining to one aspect of the present disclosure, in the selecting, when two or more groups each composed of one or more household electric devices are associated with the particular operation in the correspondence information, one of the two or more groups composed of a largest number of household electric devices that are registered to the server may be selected.

When making such a modification, a cooperative process involving a relatively large number of household electric devices is selected in the selecting, which results in a more detailed cooperative process being executed.

(7) In the cooperative process execution method pertaining to one aspect of the present disclosure, the correspondence information may further indicate a degree of priority of each of the one or more groups associated with the particular operation, and in the selecting, when two or more groups each composed of one or more household electric devices are associated with the particular operation in the correspondence information, one of the two or more groups provided with a highest degree of priority in the correspondence information may be selected.

When making such a modification, a cooperative process defined as having relatively high importance is selected in the selecting.

(8) Another aspect of the present disclosure is a cooperative process execution system including household electric devices that are registered to a server. The cooperative process execution system pertaining to another aspect of the present invention includes: a storage unit storing correspondence information associating a particular operation to be executed by a particular household electric device with one or more groups each composed of one or more household electric devices, and indicating, for each of the one or more household electric devices in each of the groups, a control signal to be transmitted to the household electric device; a detection unit detecting whether or not the particular operation is executed; a selection unit selecting one of the groups that is composed of one or more household electric devices that are registered to the server by referring to the correspondence information, the selecting executed when the detection unit detects the execution of the particular operation; and a transmission unit transmitting the control signal to each of the one or more household electric devices in the selected group.

Due to this, the cooperative process execution system pertaining to another aspect of the present disclosure determines operations to be executed by household electric devices in accordance with combinations of household electric devices that are registered to the server. Thus, the cooperative process execution system pertaining to another aspect of the present disclosure achieves execution of a cooperative process that is suitable for a combination of household electric devices possessed by a user, which differs between different users.

INDUSTRIAL APPLICABILITY

The cooperative process execution method pertaining to one aspect of the present disclosure achieves execution of a cooperative process that is suitable for a combination of household electric devices possessed by a user, which differs between different users, and is useful in systems in which a server controls a plurality of household electric devices.

REFERENCES SIGNS LIST 1, 1a, 2000 cooperative process execution system
10, 10a, 2010 server
20, 20a router
30-1 through 30-4 first through fourth household electric devices
30-1a through 30-4a first through fourth household electric devices
201 communication unit
202 storage unit
203 input unit
204 display unit
205 timer unit
206, 206a control unit
501 communication unit
502, 502a storage unit
503 input unit
504 display unit
505 timer unit
506 unique function unit
507, 507a control unit
2021 first device group
2022 second device group
2023 third device group
2220 base station

The invention claimed is:
1. A cooperative process execution method for causing household electric devices that are registered to a server to execute cooperative processes, wherein
the server stores
(i) group information including one or more group items each associating one or more household electric devices with one or more operation identifiers, the operation identifiers each indicating an operation that a corresponding household electric device is capable of executing, the group information at least including one or more group items associated with a first operation that a first household electric device is capable of executing, and

(ii) correspondence information associating one or more operation identifiers with one or more control signals, the control signals each being a signal causing a household electric device to execute an operation indicated by a corresponding operation identifier, the cooperative process execution method comprising:

detecting execution of an operation by a household electric device;

when execution of the first operation by the first household electric device is detected in the detecting, selecting one of the one or more group items associated with the first operation; and transmitting, to each of the one or more household electric devices in the selected group item, a control signal that is associated in the correspondence information with the operation identifier associated with the household electric device in the selected group item in order to cause the household electric device to execute the operation indicated by the operation identifier, wherein the server further stores a degree of priority of each of the one or more group items associated with the first operation, and in the selecting, when two or more group items are associated with the first operation, one of the two or more group items provided with a highest degree of priority is selected.

2. The cooperative process execution method of claim 1, wherein the control signal transmitted in the transmitting is a predefined command for controlling the household electric device that receives the control signal.

3. The cooperative process execution method of claim 1, wherein the control signal transmitted in the transmitting indicates the execution of the first operation, and each household electric device that is to execute an operation upon the execution of the first operation stores therein operation information indicating the operation, the cooperative process execution method further comprising:

executing the operation indicated by the operation information, the executing performed by each household electric device receiving the control signal and storing the operation information therein.

4. The cooperative process execution method of claim 3, wherein the group selected in the selecting is a group composed of all household electric devices that are registered to the server, and in the executing, each household electric device receiving the control signal but not storing the operation information therein discards the control signal.

5. A cooperative process execution system including household electric devices that are registered to a server, the cooperative process execution system comprising:

a storage unit storing (i) group information including one or more group items each associating one or more household electric devices with one or more operation identifiers, the operation identifiers each indicating an operation that a corresponding household electric device is capable of executing, the group information at least including one or more group items associated with a first operation that a first household electric device is capable of executing, and (ii) correspondence information associating one or more operation identifiers with one or more control signals, the control signals each being a signal causing a household electric device to execute an operation indicated by a corresponding operation identifier;

a detection unit detecting execution of an operation by a household electric device;

a selection unit, when execution of the first operation by the first household electric device is detected by the detection unit, selecting one of the one or more group items associated with the first operation; and a transmission unit transmitting, to each of the one or more household electric devices in the selected group item, a control signal that is associated in the correspondence information with the operation identifier associated with the household electric device in the selected group item in order to cause the household electric device to execute the operation indicated by the operation identifier, wherein the storage unit further stores a degree of priority of each of the one or more group items associated with the first operation, and in the selecting by the selection unit, when two or more group items are associated with the first operation, one of the two or more group items provided with a highest degree of priority is selected.

* * * * *